(12) United States Patent
Toyoda et al.

(10) Patent No.: US 8,749,825 B2
(45) Date of Patent: Jun. 10, 2014

(54) IMAGE PROCESSING APPARATUS, METHOD AND NON-TRANSITORY COMPUTER READABLE MEDIUM STORING PROGRAM WITH VARIABLE POLLING INTERVAL

(75) Inventors: Akihito Toyoda, Kanagawa (JP); Takashi Aoki, Kanagawa (JP); Masaya Kaji, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 427 days.

(21) Appl. No.: 13/237,654

(22) Filed: Sep. 20, 2011

(65) Prior Publication Data
US 2012/0243037 A1    Sep. 27, 2012

(30) Foreign Application Priority Data

Mar. 25, 2011   (JP) ................................. 2011-067141

(51) Int. Cl.
*G06F 3/12* (2006.01)
(52) U.S. Cl.
USPC ........... 358/1.15; 358/1.1; 709/230; 709/225; 709/250; 710/3; 710/9; 702/186
(58) Field of Classification Search
None
See application file for complete search history.

(56) References Cited

U.S. PATENT DOCUMENTS

| | | | | |
|---|---|---|---|---|
| 6,453,268 | B1 * | 9/2002 | Carney et al. | 702/186 |
| 8,392,923 | B2 * | 3/2013 | Walters | 718/102 |
| 2002/0140962 | A1 | 10/2002 | Oka | |

FOREIGN PATENT DOCUMENTS

| | | |
|---|---|---|
| JP | 2002-297336 A | 10/2002 |
| JP | 2002-297462 A | 10/2002 |
| JP | 2009-282950 A | 12/2009 |
| JP | 2010-198055 A | 9/2010 |

* cited by examiner

*Primary Examiner* — Paul F Payer
(74) *Attorney, Agent, or Firm* — Sughrue Mion, PLLC

(57) ABSTRACT

An image processing apparatus includes: an acquiring unit that acquires a display request including a first external apparatus identification information and screen identification information; a storage unit storing external apparatus screen information; an update unit updating the first external apparatus screen information whenever the display request is acquired; a determining unit determining a polling interval for a first external apparatus on the basis of the stored external apparatus screen information; and a transmitting unit transmitting, to the first external apparatus, screen data which includes information of the determined polling interval, wherein, when a second external apparatus identification information item corresponding to the same screen identification information as that in the display request is stored in the storage unit, the determining unit determines the polling interval for the first external apparatus to be less than that for a second external apparatus indicated by the second external apparatus identification information item.

20 Claims, 26 Drawing Sheets

| Host name/IP | CURRENTLY DISPLAYED SCREEN | SET INFORMATION | CHANGE FLAG |
|---|---|---|---|
| 111.111.111.111 | DESTINATION TABLE SCREEN | ABBREVIATED INFORMATION | OFF |
| Mc01(112.112.112.112) | DESTINATION TABLE SCREEN | ABBREVIATED INFORMATION | ON |
| 113.113.113.113 | DESTINATION TABLE SCREEN | ABBREVIATED INFORMATION | ON |
| 222.222.222.222 | MEMORY SETTING SCREEN | MACHINE MEMORY INFORMATION | OFF |
| 234.234.234.234 | MEMORY SETTING SCREEN | MACHINE MEMORY INFORMATION | ON |
| Mc02(223.223.223.223) | MAIN BODY CONFIGURATION SCREEN | MACHINE MEMORY INFORMATION | OFF |
| 001.001.001.001 | JOB STATUS CONFIRMATION SCREEN | JOB INFORMATION | OFF |
| 002.002.002.002 | PRINT START SCREEN | PRINTER PARAMETER | OFF |
| ⋮ | ⋮ | ⋮ | ⋮ |

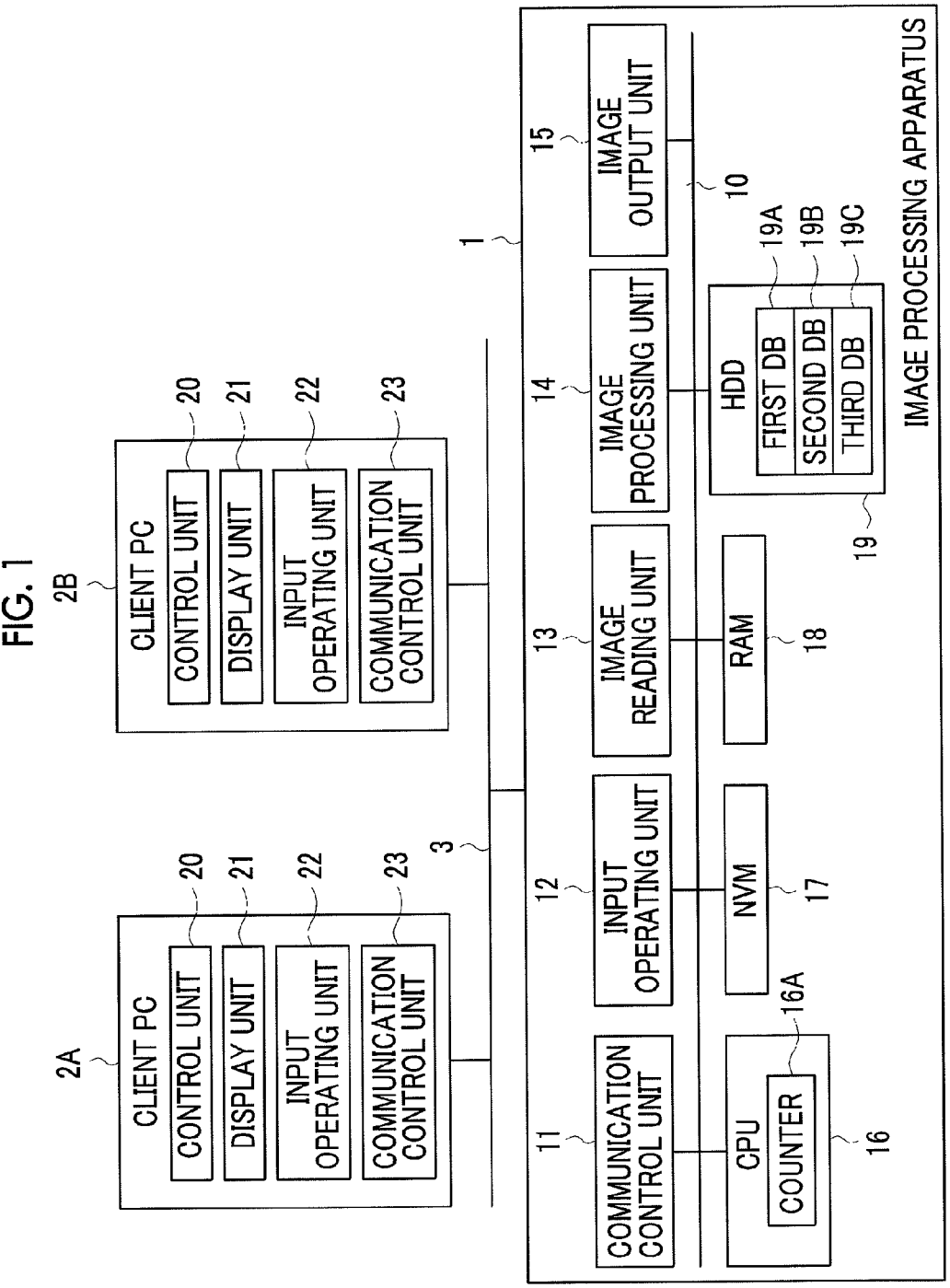

FIG. 2A

| Host name/IP | CURRENTLY DISPLAYED SCREEN | SET INFORMATION | CHANGE FLAG |
|---|---|---|---|
| 111.111.111.111 | DESTINATION TABLE SCREEN | ABBREVIATED INFORMATION | OFF |
| Mc01(112.112.112.112) | DESTINATION TABLE SCREEN | ABBREVIATED INFORMATION | ON |
| 113.113.113.113 | DESTINATION TABLE SCREEN | ABBREVIATED INFORMATION | ON |
| 222.222.222.222 | MEMORY SETTING SCREEN | MACHINE MEMORY INFORMATION | OFF |
| 234.234.234.234 | MEMORY SETTING SCREEN | MACHINE MEMORY INFORMATION | ON |
| Mc02(223.223.223.223) | MAIN BODY CONFIGURATION SCREEN | MACHINE MEMORY INFORMATION | OFF |
| 001.001.001.001 | JOB STATUS CONFIRMATION SCREEN | JOB INFORMATION | OFF |
| 002.002.002.002 | PRINT START SCREEN | PRINTER PARAMETER | OFF |
| ... | ... | ... | ... |

FIG. 2B

| SCREEN | SET INFORMATION INCLUDED IN SCREEN |
|---|---|
| DESTINATION TABLE SCREEN | ABBREVIATED INFORMATION |
| MEMORY SETTING SCREEN | MACHINE MEMORY INFORMATION |
| MAIN BODY CONFIGURATION SCREEN | MACHINE MEMORY INFORMATION |
| JOB STATUS CONFIRMATION SCREEN | JOB INFORMATION |
| PRINT START SCREEN | PRINT PARAMETER |
| TRAY INFORMATION SETTING SCREEN | TRAY SETTING INFORMATION |
| SECURITY SETTING SCREEN | SECURITY SETTING INFORMATION |
| ... | ... |

FIG. 2C

| SCREEN | ASSOCIATION SCREEN | | |
|---|---|---|---|
| JOB STATUS CONFIRMATION SCREEN | PRINT START SCREEN | FILE EXTRACTING SCREEN | |
| PRINT START SCREEN | JOB STATUS CONFIRMATION SCREEN | SUPPLY CONFIRMATION SCREEN | ... |
| ... | | | |

FIG. 4B

| | | | | |
|---|---|---|---|---|
| STATUS | JOB | PRINT | SCAN | SUPPORT |

- JOB
- JOB LIST
- HISTORY LIST
- ERROR HISTORY

JOB LIST

| JOB NAME | OWNER | STATUS | TYPE | NUMBER OF PAGES |
|---|---|---|---|---|
| ☐ test.ps | xxxxx | BEING EXECUTED | — | 1 |
| ☐ letter.ps | aaaaa | WAIT FOR EXECUTION | PRINTER | 2 |
| ☐ letter.ps | aaaaa | PAUSE | COPY | 3 |
| ☐ letter.ps | aaaaa | WAIT FOR OPERATION | SCANNER | — |
| ... | ... | ... | ... | ... |

[DISPLAY UPDATE]

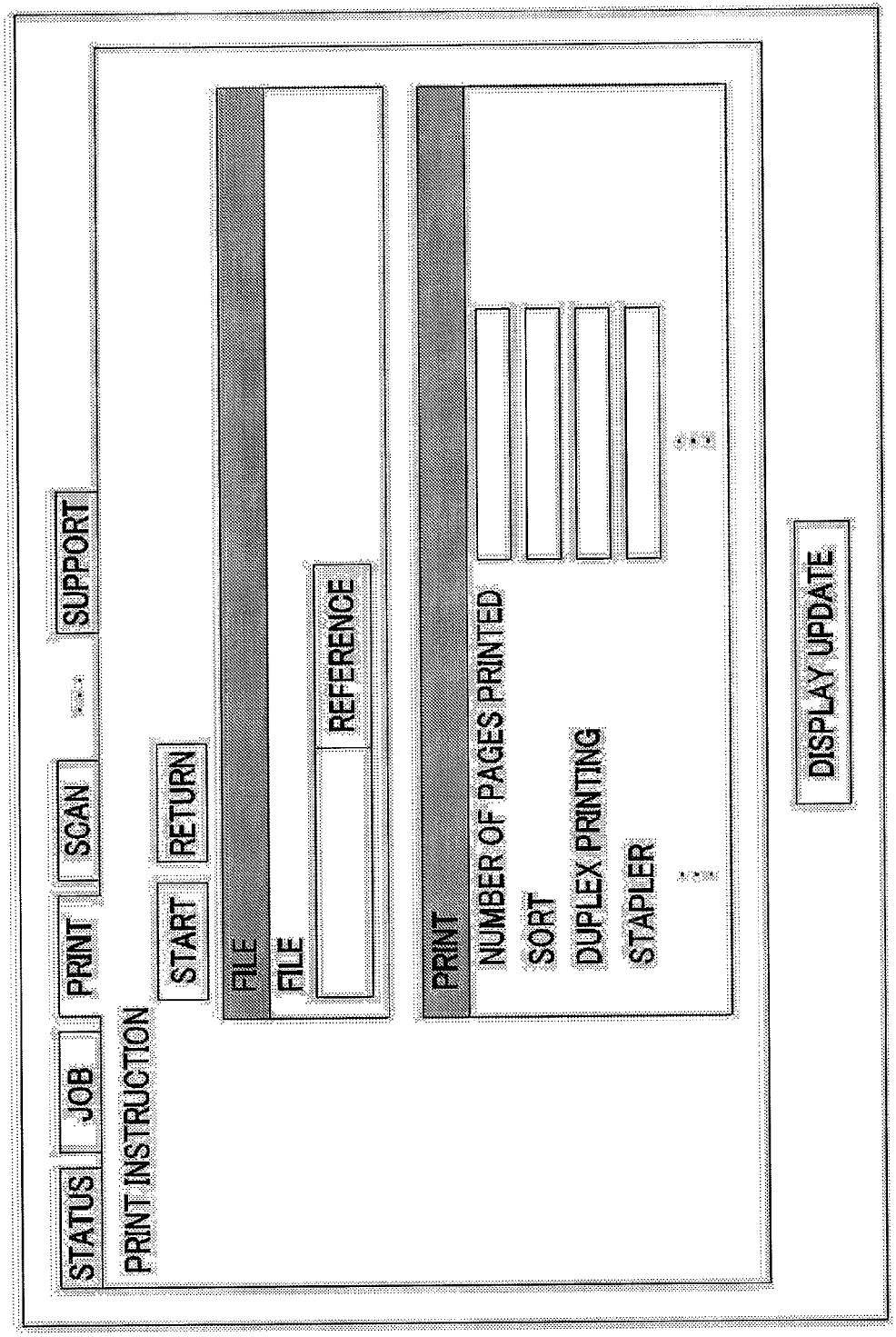

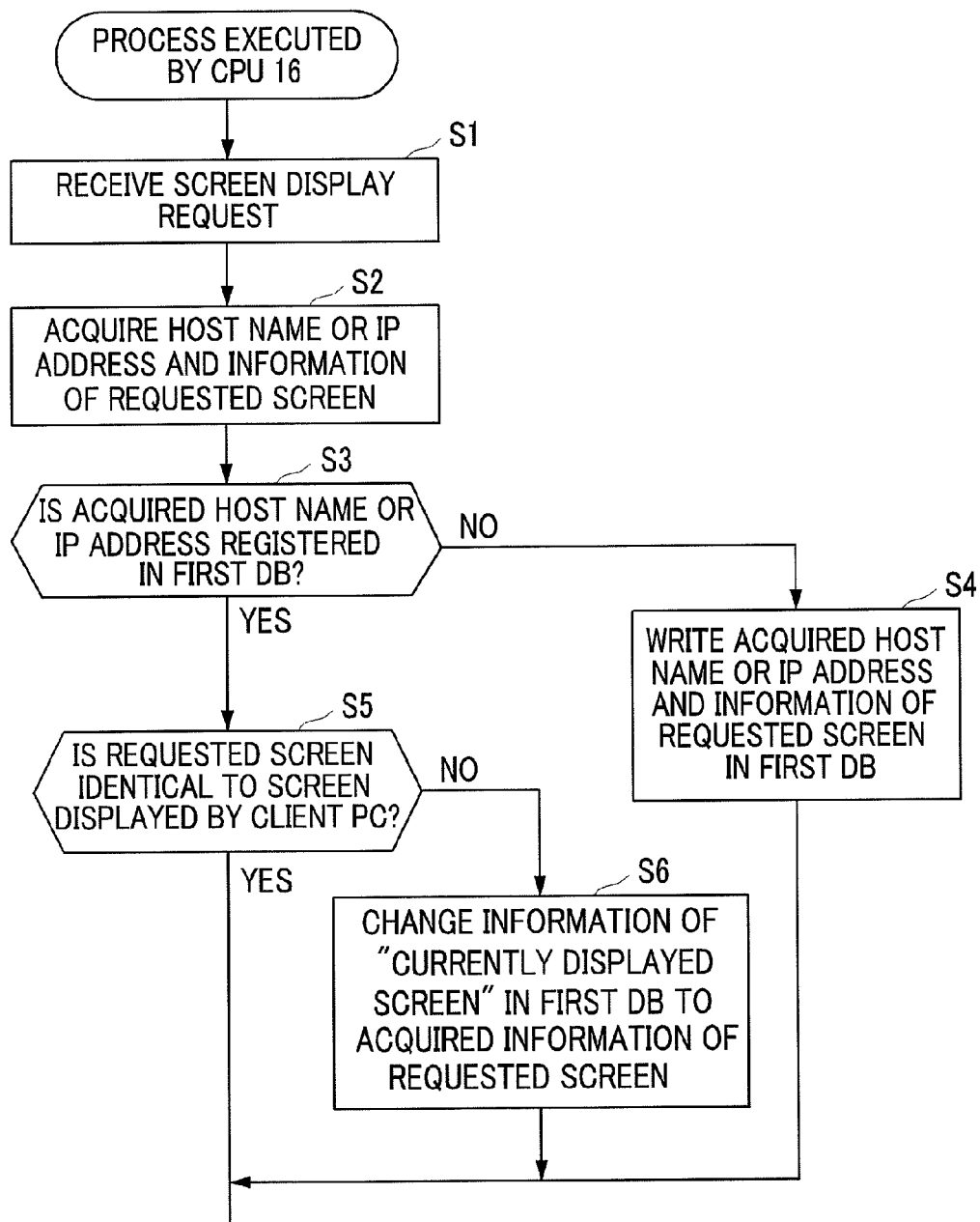

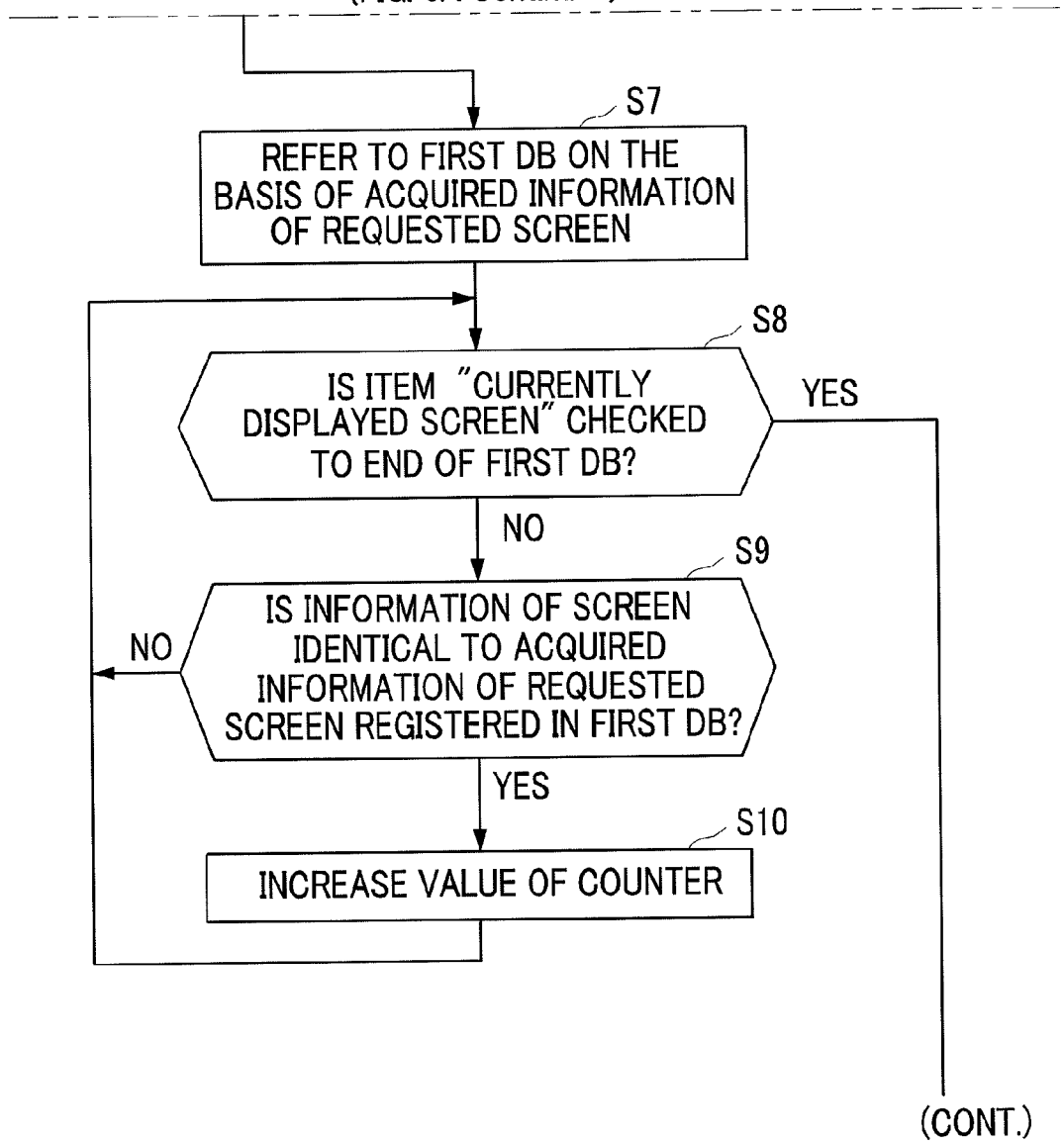

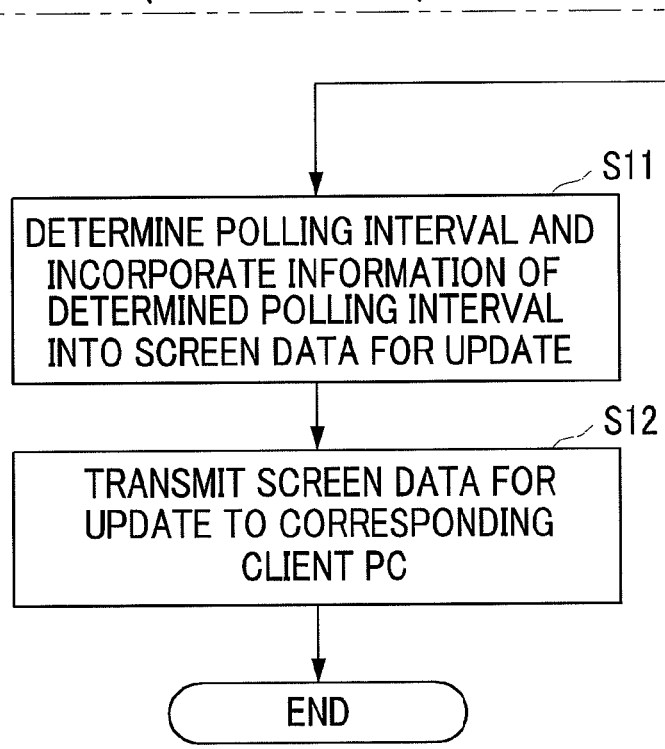

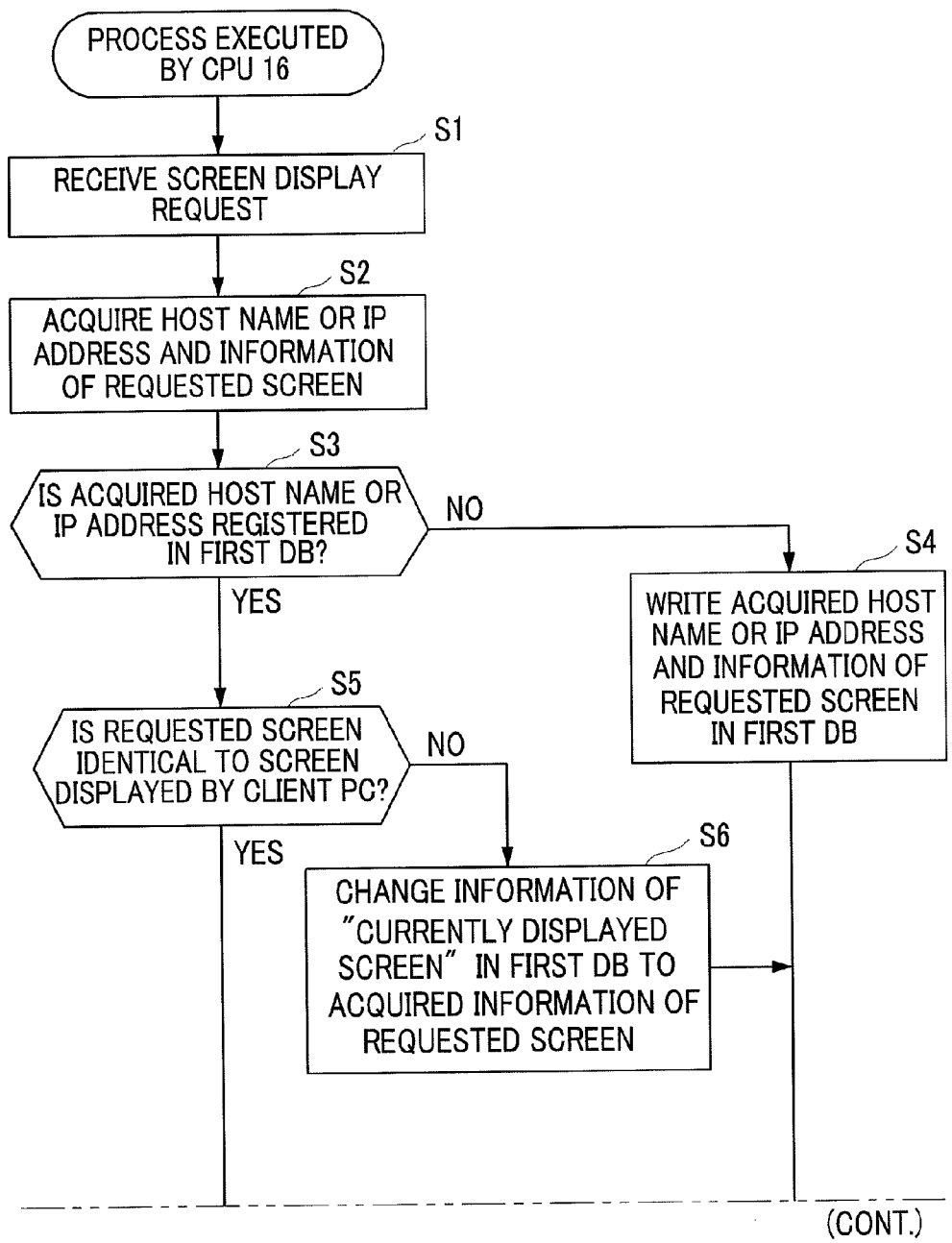

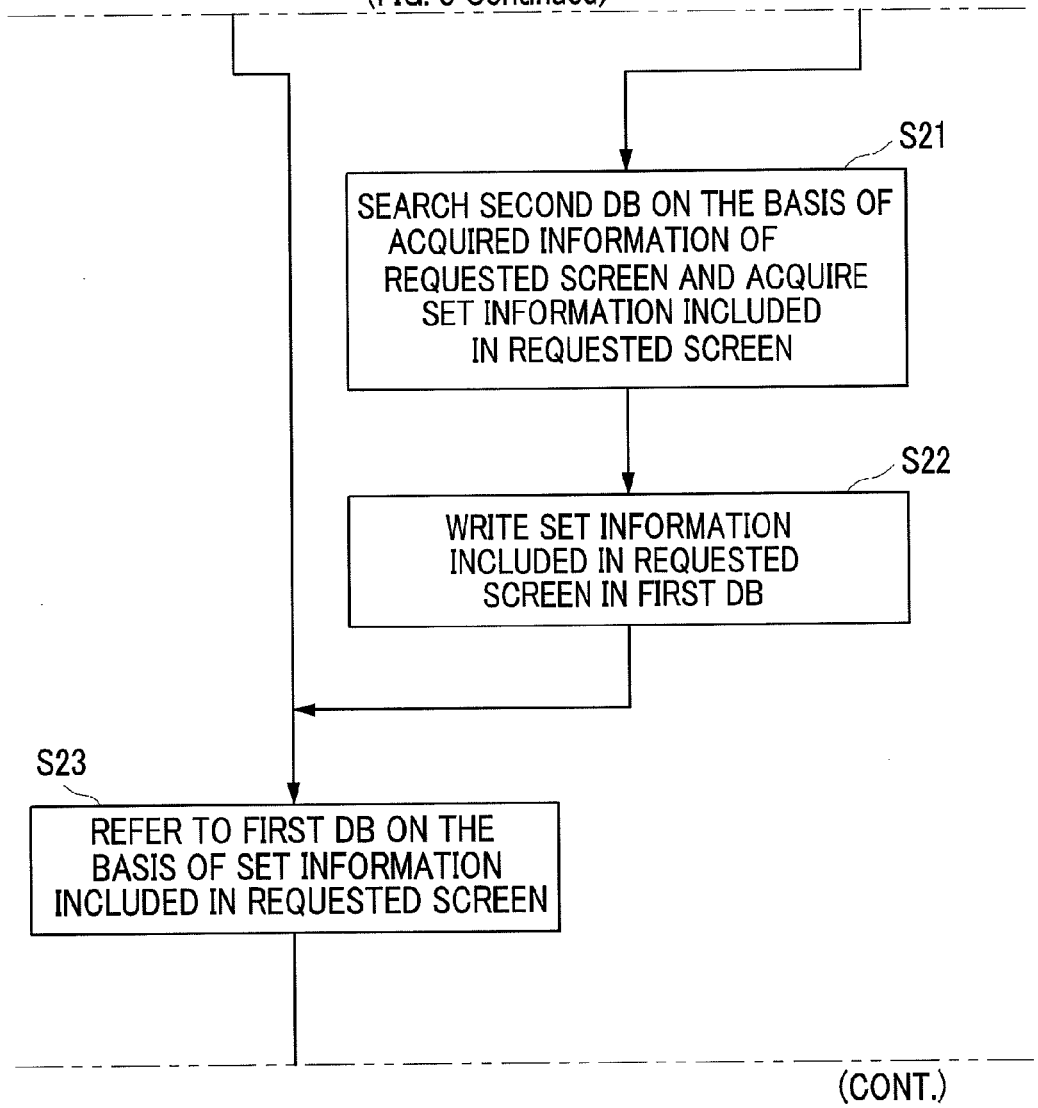

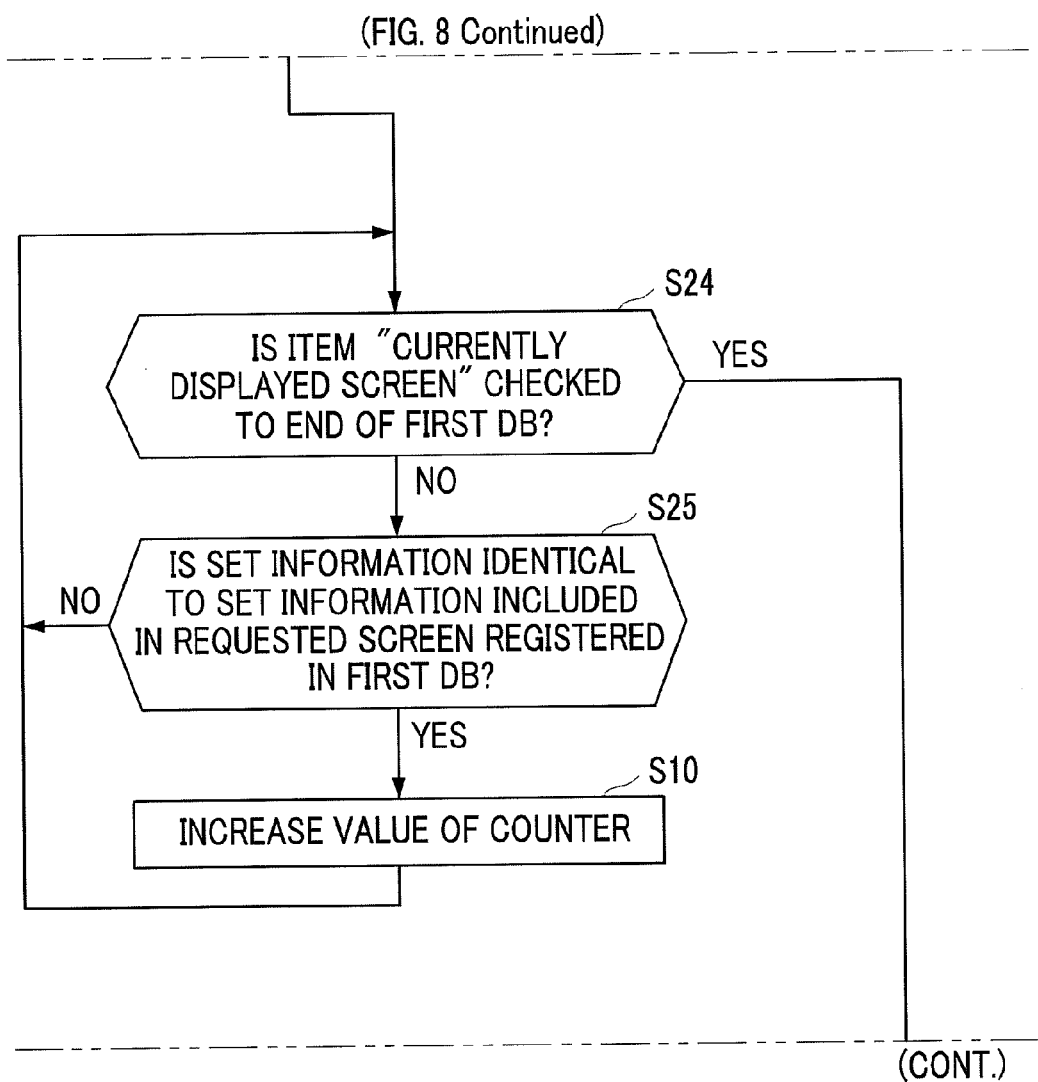

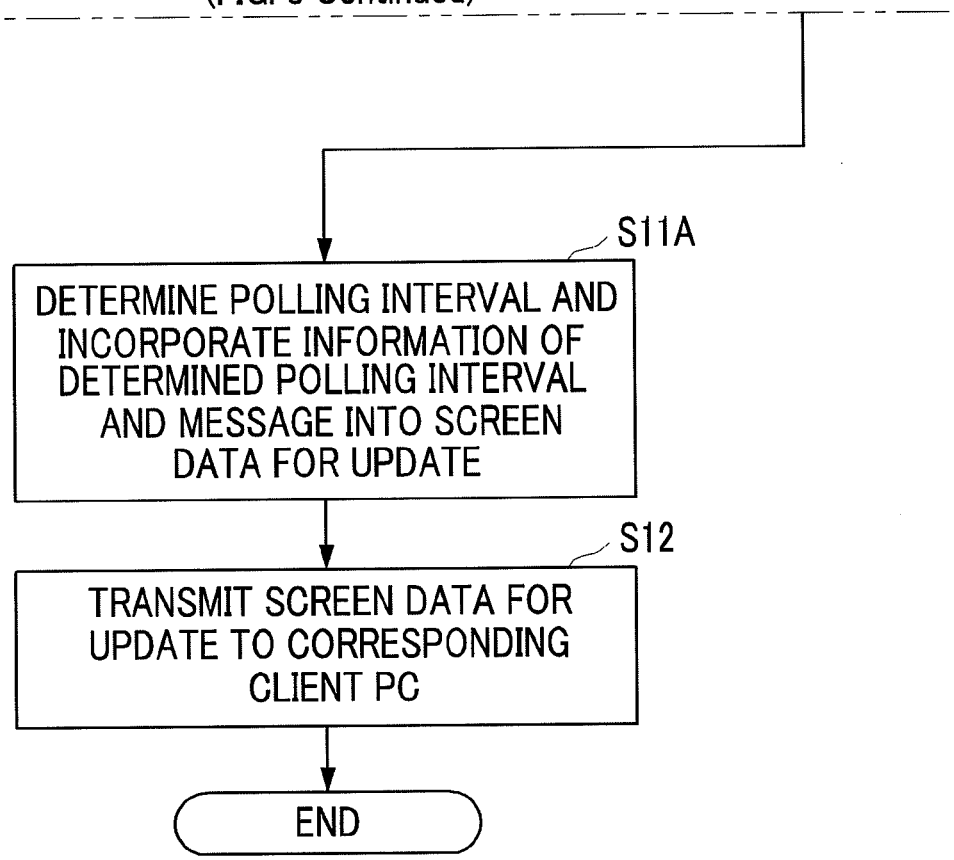

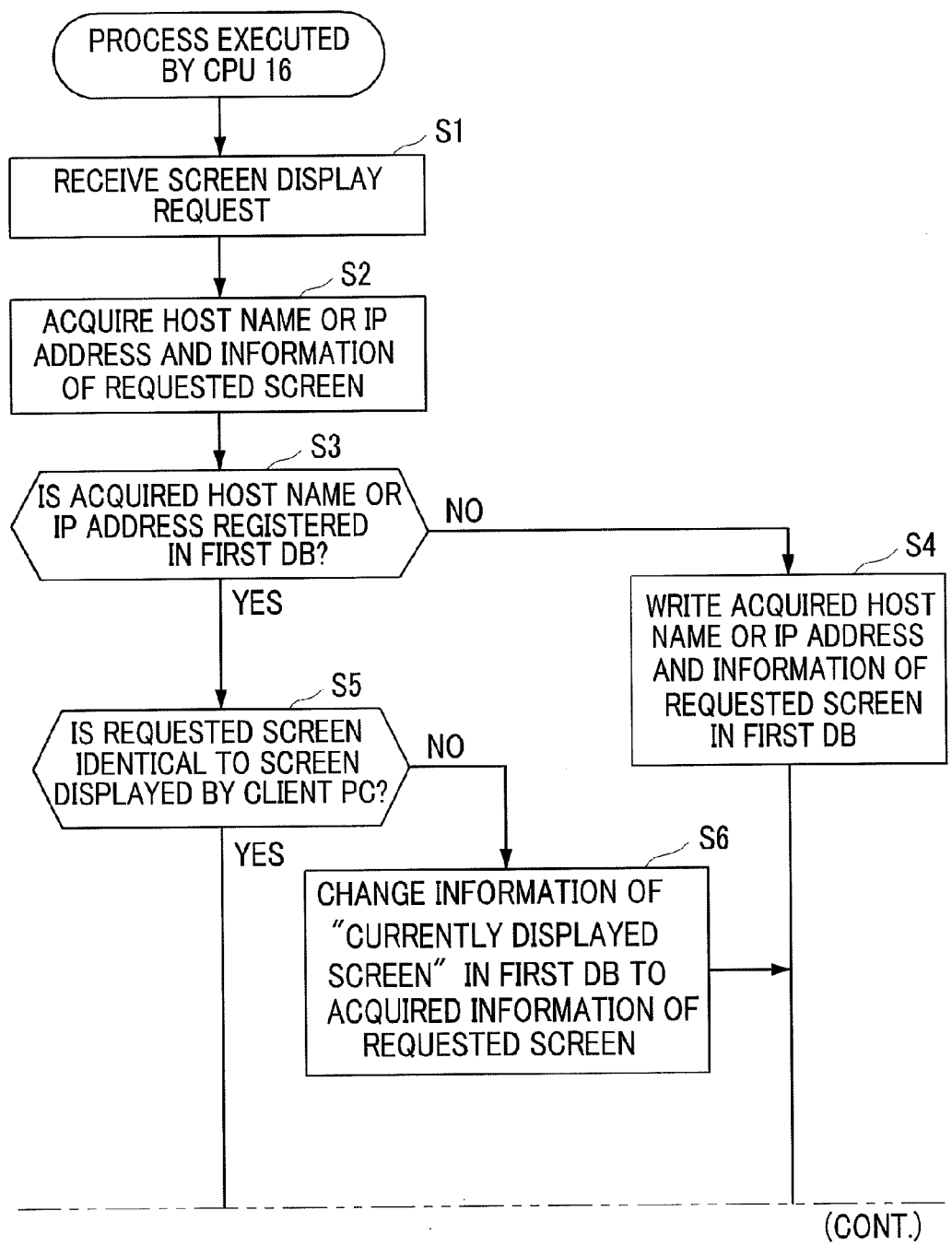

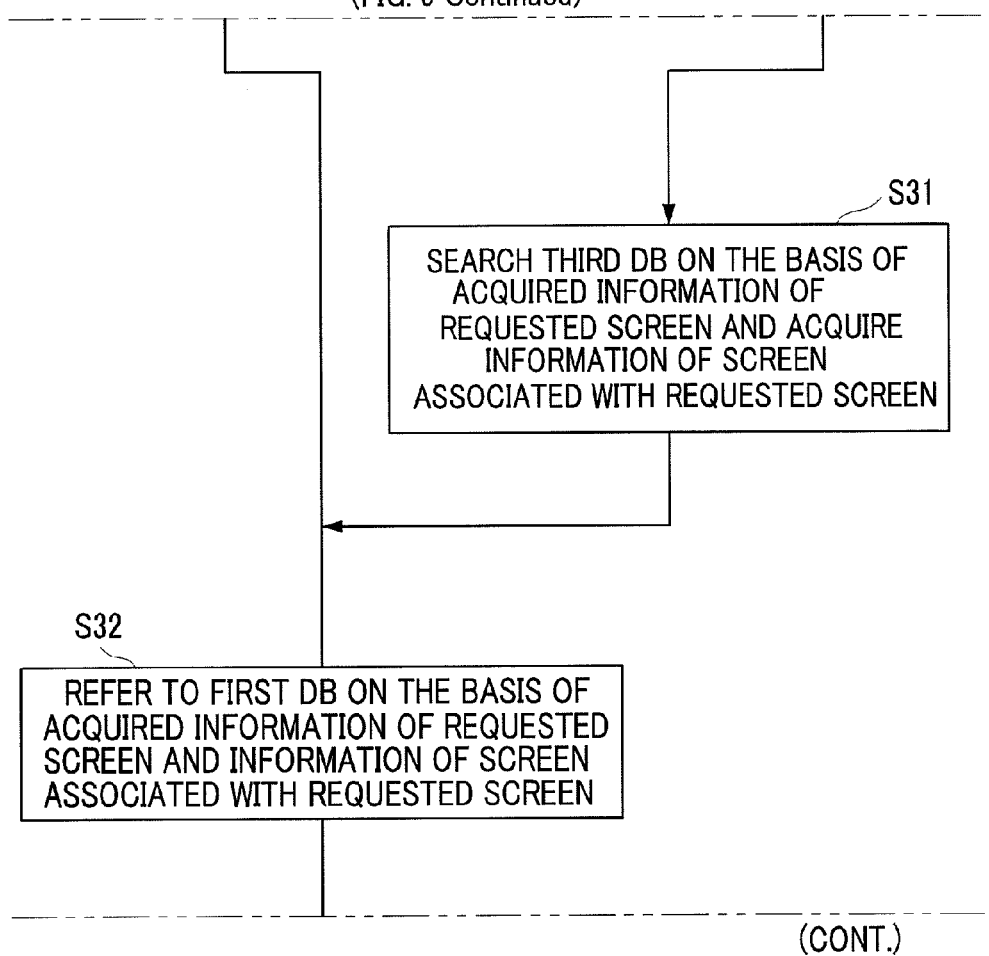

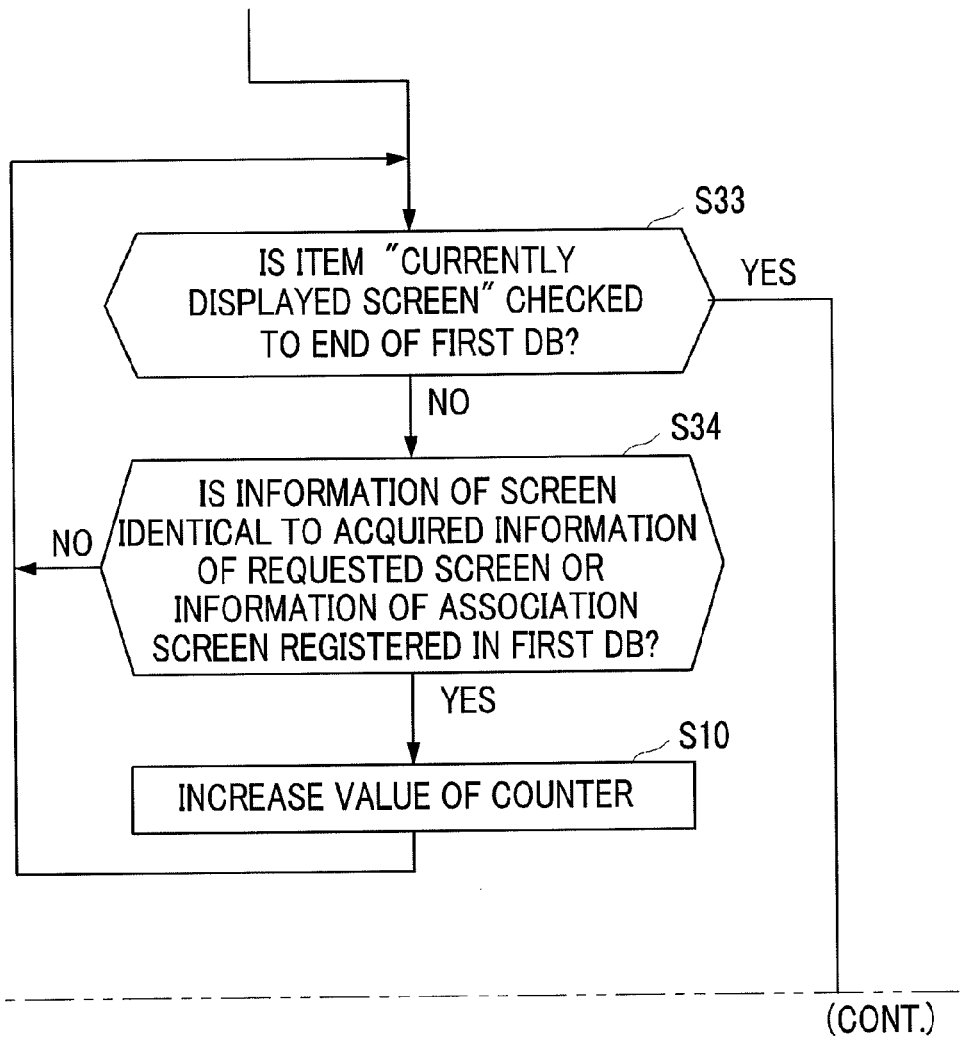

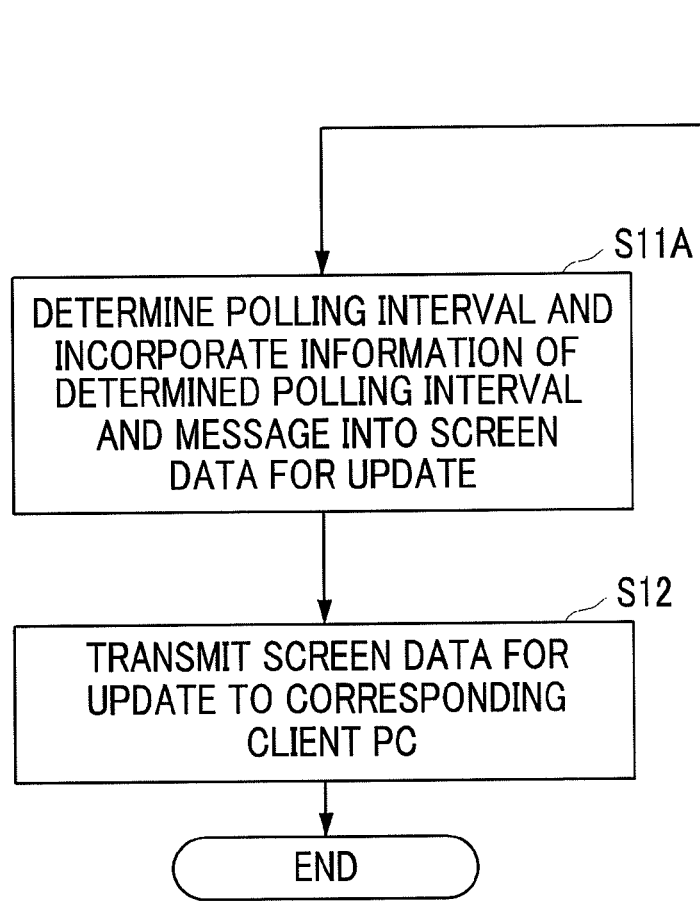
(FIG. 9 Continued)

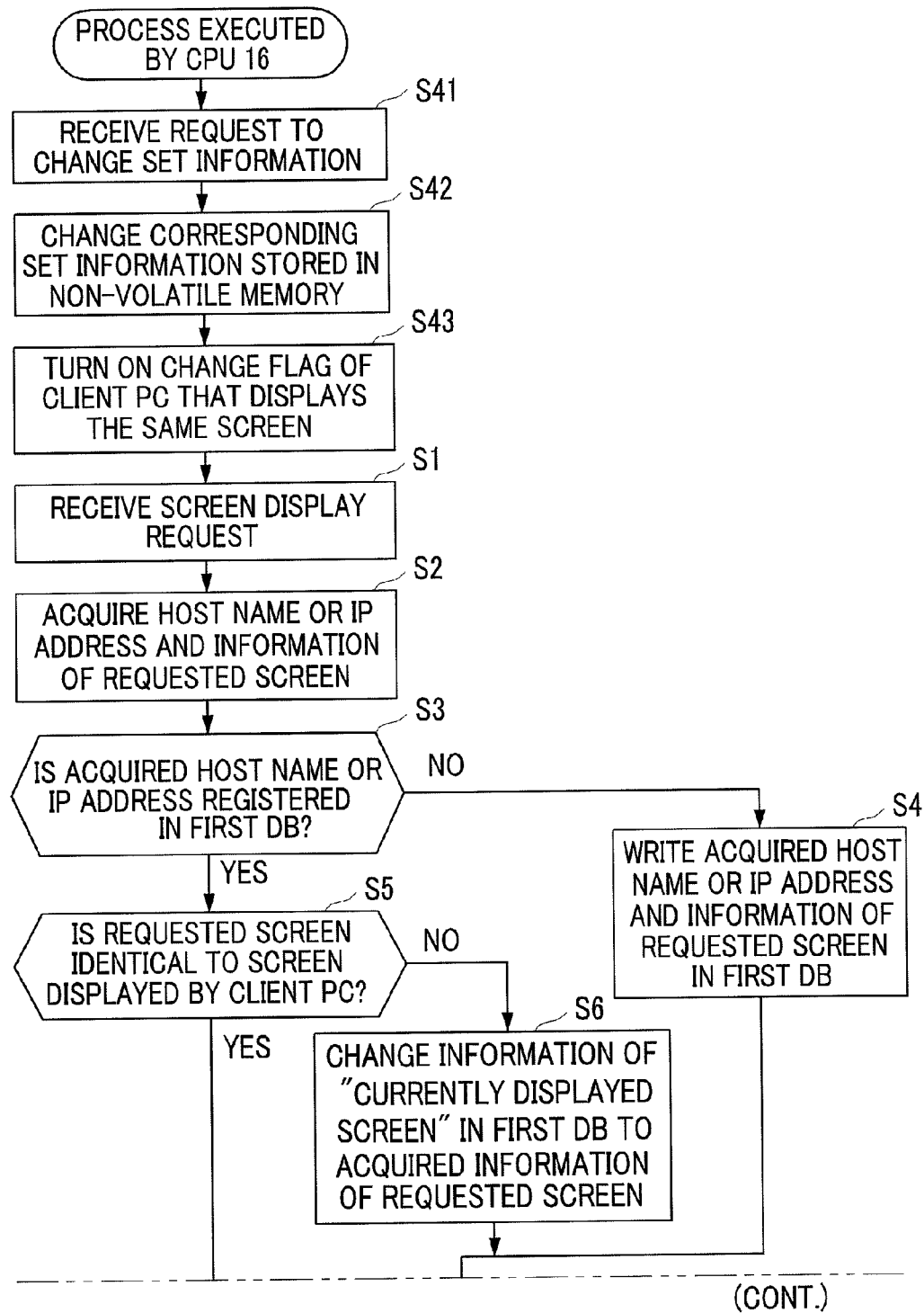

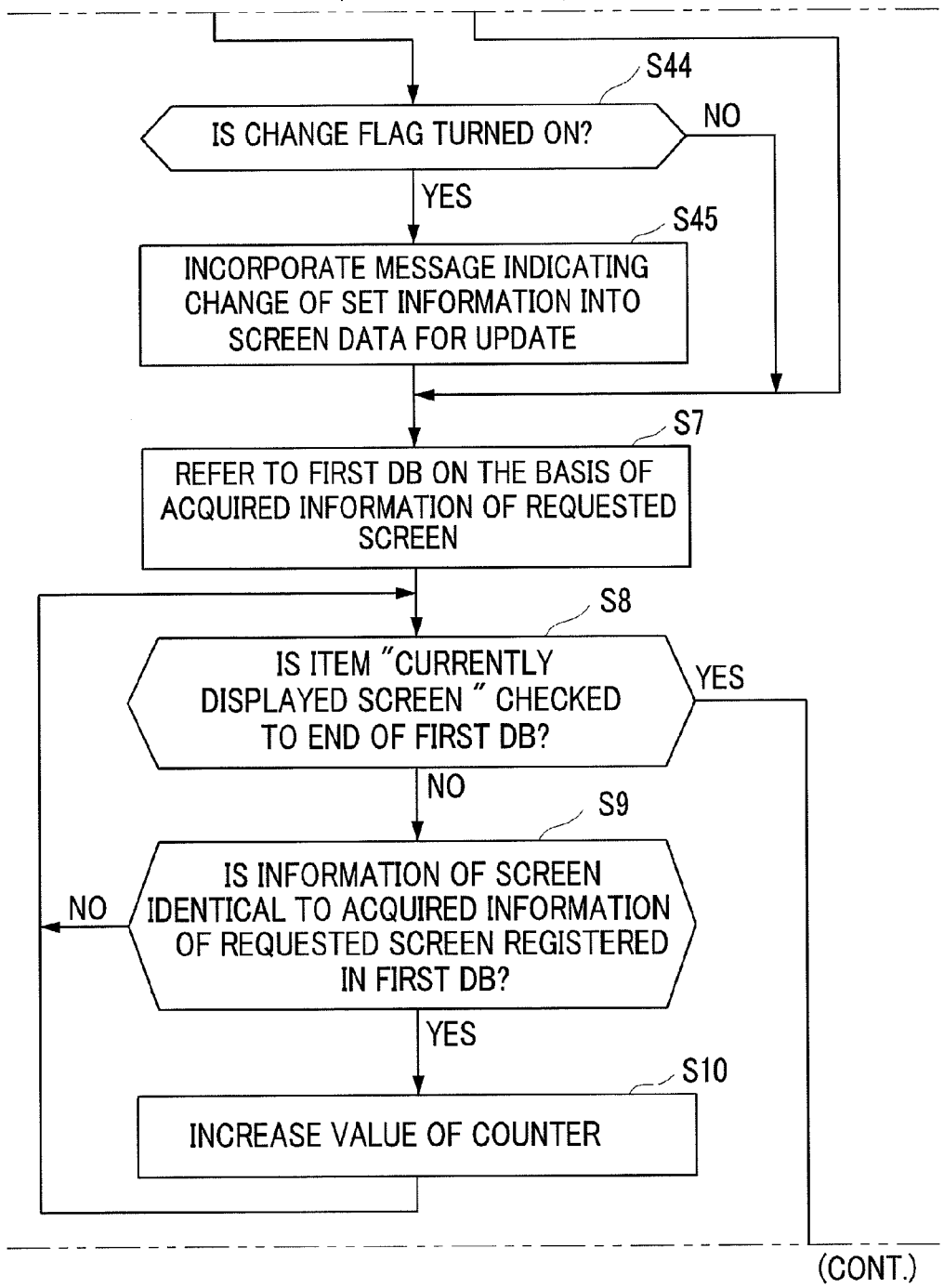

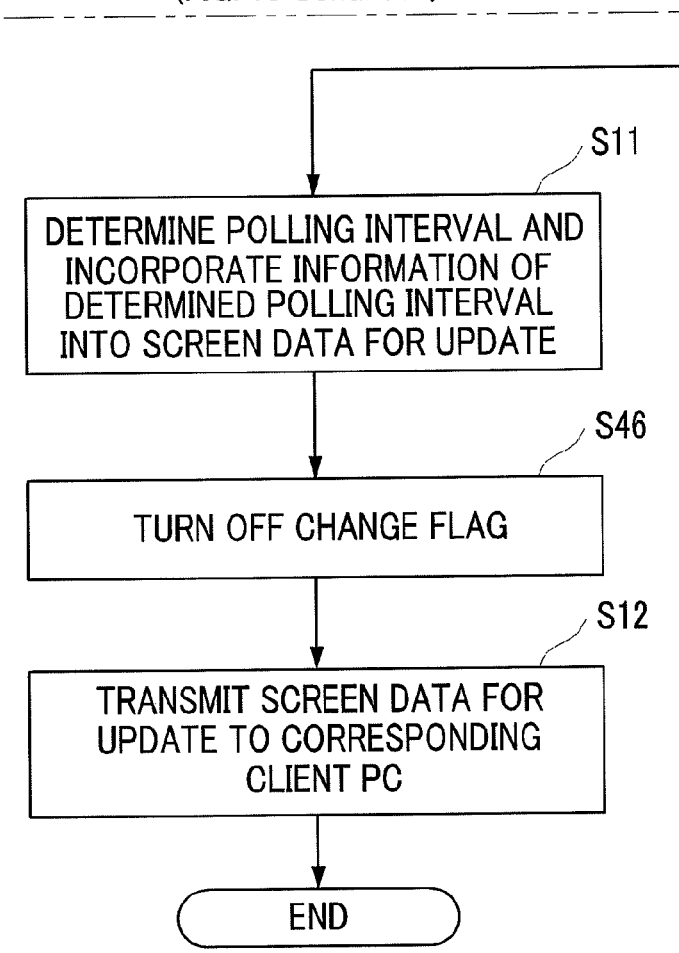

IMAGE PROCESSING APPARATUS, METHOD AND NON-TRANSITORY COMPUTER READABLE MEDIUM STORING PROGRAM WITH VARIABLE POLLING INTERVAL

CROSS-REFERENCE TO RELATED APPLICATIONS

This application is based on and claims priority under 35 USC 119 from Japanese Patent Application No. 2011-067141 filed Mar. 25, 2011.

BACKGROUND (i) Technical Field

The present invention relates to an image processing apparatus, an image processing method, and a non-transitory computer readable medium storing a program.

(ii) Related Art

In recent years, a technique has been proposed in which a computer that requests an image processing apparatus connected to a network to perform printing checks the execution state of printing or the state of the image processing apparatus. In addition, an information processing apparatus has been proposed which acquires the state of the image processing apparatus (for example, an abnormal state or a printing state) and changes a polling interval for the image processing apparatus.

SUMMARY

According to an aspect of the invention, there is provided an image processing apparatus including: an acquiring unit that acquires a display request including a first external apparatus identification information capable of identifying a first external apparatus and screen identification information capable of identifying a screen from the first external apparatus; a storage unit that stores external apparatus screen information in which the first external apparatus identification information and the screen identification information acquired by the acquiring unit are associated with each other; an update unit that updates the first external apparatus screen information whenever the display request is acquired; a determining unit that determines a polling interval for the first external apparatus on the basis of the external apparatus screen information stored in the storage unit; and a transmitting unit that transmits, to the first external apparatus, screen data which includes information of the determined polling interval and is displayed on a screen corresponding to the display request, wherein, when a second external apparatus identification information item corresponding to the same screen identification information as that included in the display request is stored in the storage unit, the determining unit determines the polling interval for the first external apparatus to be less than a polling interval for the second external apparatus indicated by the second external apparatus identification information item.

BRIEF DESCRIPTION OF THE DRAWINGS

Exemplary embodiments of the present invention will be described in detail based on the following figures, wherein:

FIG. 1 is a block diagram illustrating the structure of a system including an external apparatus and an image processing apparatus according to a first exemplary embodiment;

FIG. 2A is a diagram illustrating an example of a first database 19A stored in an HDD 19;

FIG. 2B is a diagram illustrating an example of a second database 19B stored in the HDD 19;

FIG. 2C is a diagram illustrating an example of a third database 19C stored in the HDD 19;

FIG. 4B is a diagram illustrating an example of a job status confirmation screen registered in the first database 19A;

FIG. 5 is a diagram illustrating an example of a job start screen registered in the first database 19A;

FIG. 6A is a flowchart illustrating the process of a CPU 16 in an image processing apparatus 1;

FIG. 8 is a flowchart illustrating a second modification of the process shown in FIG. 6A;

FIG. 9 is a flowchart illustrating a third modification of the process shown in FIG. 6A;

FIG. 10 is a flowchart illustrating a fourth modification of the process shown in FIG. 6A.

DETAILED DESCRIPTION

Figure 3A:
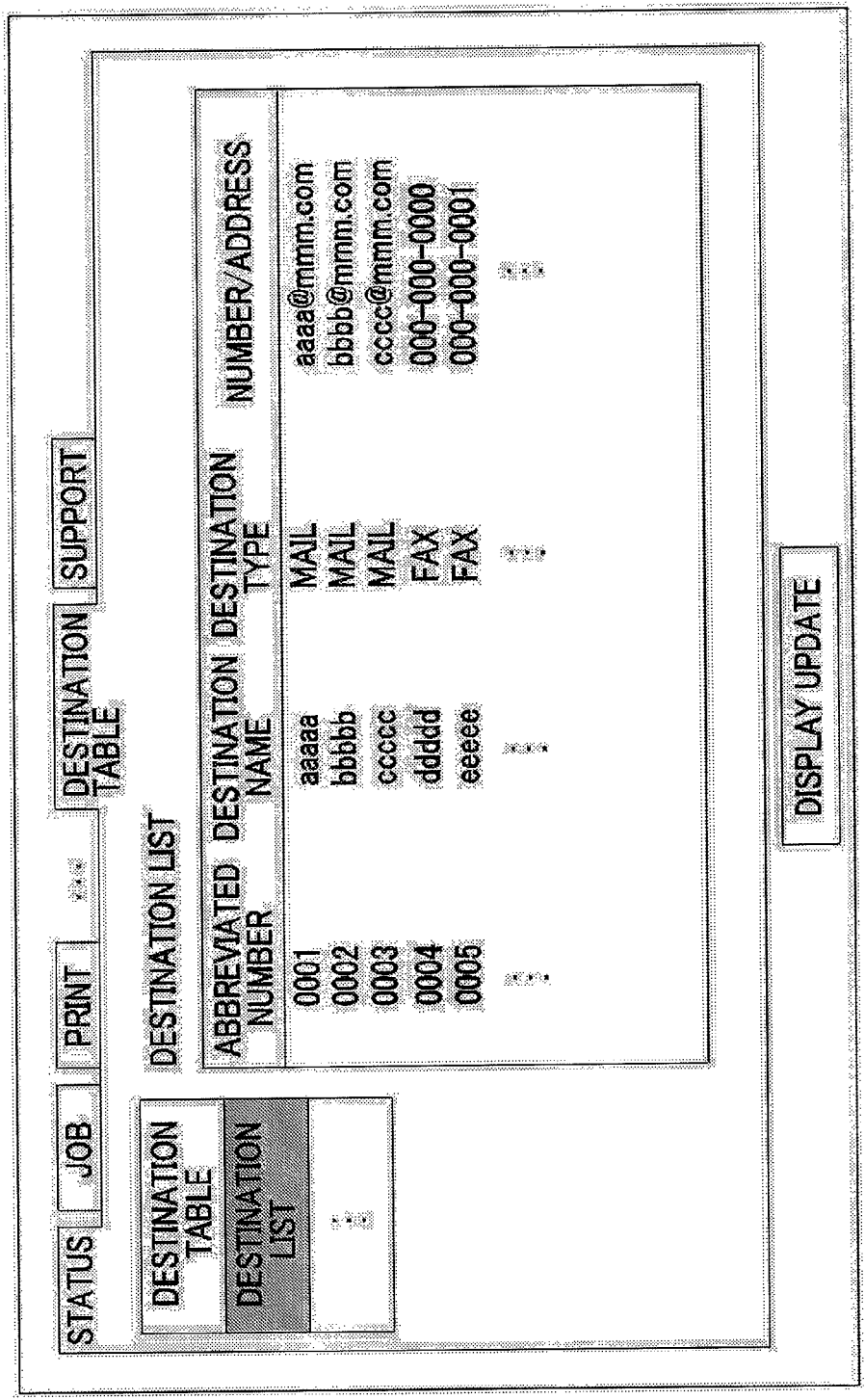
FIG. 3A is a diagram illustrating an example of a destination table screen registered in the first database 19A.

Hereinafter, exemplary embodiments of the invention will be described with reference to the accompanying drawings.
(First Exemplary Embodiment)

FIG. 1 is a block diagram illustrating the structure of a system including an external apparatus and an image processing apparatus according to a first exemplary embodiment.

In FIG. 1, an image processing apparatus 1 is, for example, a printer, a copier, or a multi-function machine. The image processing apparatus 1 includes a communication control unit 11, an input operating unit 12, an image reading unit 13, an image processing unit 14, an image output unit 15, a CPU (Central Processing Unit) 16, a non-volatile memory (NVM) 17, a RAM (Random Access Memory) 18, and a hard disk drive (HDD) 19. The CPU 16 functions as an acquiring unit, an update unit, a determining unit, and a transmitting unit. The HDD 19 functions as a storage unit. The communication control unit 11 is connected to the input operating unit 12, the image reading unit 13, the image processing unit 14, the image output unit 15, the CPU 16, the non-volatile memory 17, the RAM 18, and the hard disk drive (HDD) 19 through a bus 10. The communication control unit 11 controls communication with a client PC 2A or 2B. The input operating unit 12 is a liquid crystal display unit with a touch panel and displays various states of the image processing apparatus 1 or is used to select functions. The image reading unit 13 is a scanner and reads images. The image processing unit 14 performs various kinds of image processing on an image to be printed. The image output unit 15 outputs an image onto a sheet. The CPU 16 controls each component of the image processing apparatus 1. The non-volatile memory 17 stores control programs of the image processing apparatus 1 and various kinds of set information of the image processing apparatus 1. The RAM 18 functions as a working memory.

The HDD 19 stores a first database 19A, a second database 19B, a third database 19C, and various kinds of data. The first database 19A, the second database 19B, and the third database 19C function as external apparatus screen information.

Each of the client PCs 2A and 2B, which are external apparatuses, includes a control unit 20 that controls the overall operation of the apparatus, a display unit 21 that displays a browser, an input operating unit 22 that inputs an operation instruction to the client PC 2A or 2B, and a communication control unit 23 that controls communication with the image processing apparatus 1. The display unit 21 may be provided outside the client PCs 2A and 2B and may be connected to the control unit 20. The browser displayed on the display unit 21 displays the set information of the image processing apparatus 1 or the state of the image processing apparatus 1. The client PCs 2A and 2B are connected to the image processing apparatus 1 through a network 3. Plural client PCs may be provided in the system shown in FIG. 1, and the number of client PCs is not limited to two.

FIG. 2A is a diagram illustrating an example of the first database 19A stored in the HDD 19. In FIG. 2A, an item "host name/IP" indicates the host name or IP address of the client PC which accesses the image processing apparatus 1. An item "displayed screen" indicates the kind of screen displayed by the client PC which accesses the image processing apparatus 1. An item "set information" indicates set information included in the content of the screen. An item "change flag" indicates a flag that is turned on when the set information is changed and is turned off when the set information is not changed.

The items "host name/IP", "displayed screen", "set information", and "change flag" of the first database 19A, are associated with each other. The information of the items "host name/IP", "displayed screen", "set information", and "change flag" (that is, the information of each row of the first database 19A) is stored until the process is timed out or when a log-out request is received from the client PC. The CPU 16 updates the information of the item "displayed screen" in the first database 19A which corresponds to a host name or an IP address included in a screen display request from the client PC 2A or 2B, on the basis of the information of a requested screen included in the display request, whenever the screen display request is acquired from the client PC 2A or 2B. When the host name or the IP address included in the display request is not registered in the first database 19A, the CPU 16 writes the host name or the IP address included in the display request and the information of the requested screen in the first database 19A.

FIG. 3A shows an example of a destination table screen registered in the first database 19A. For example, the destination table screen includes as a destination list an abbreviated number, a destination name, the kind of destination, and a number/address. The information of the abbreviated number, the destination name, the kind of destination, and the number/address is abbreviated information registered in the first database 19A.

Figure 3B:
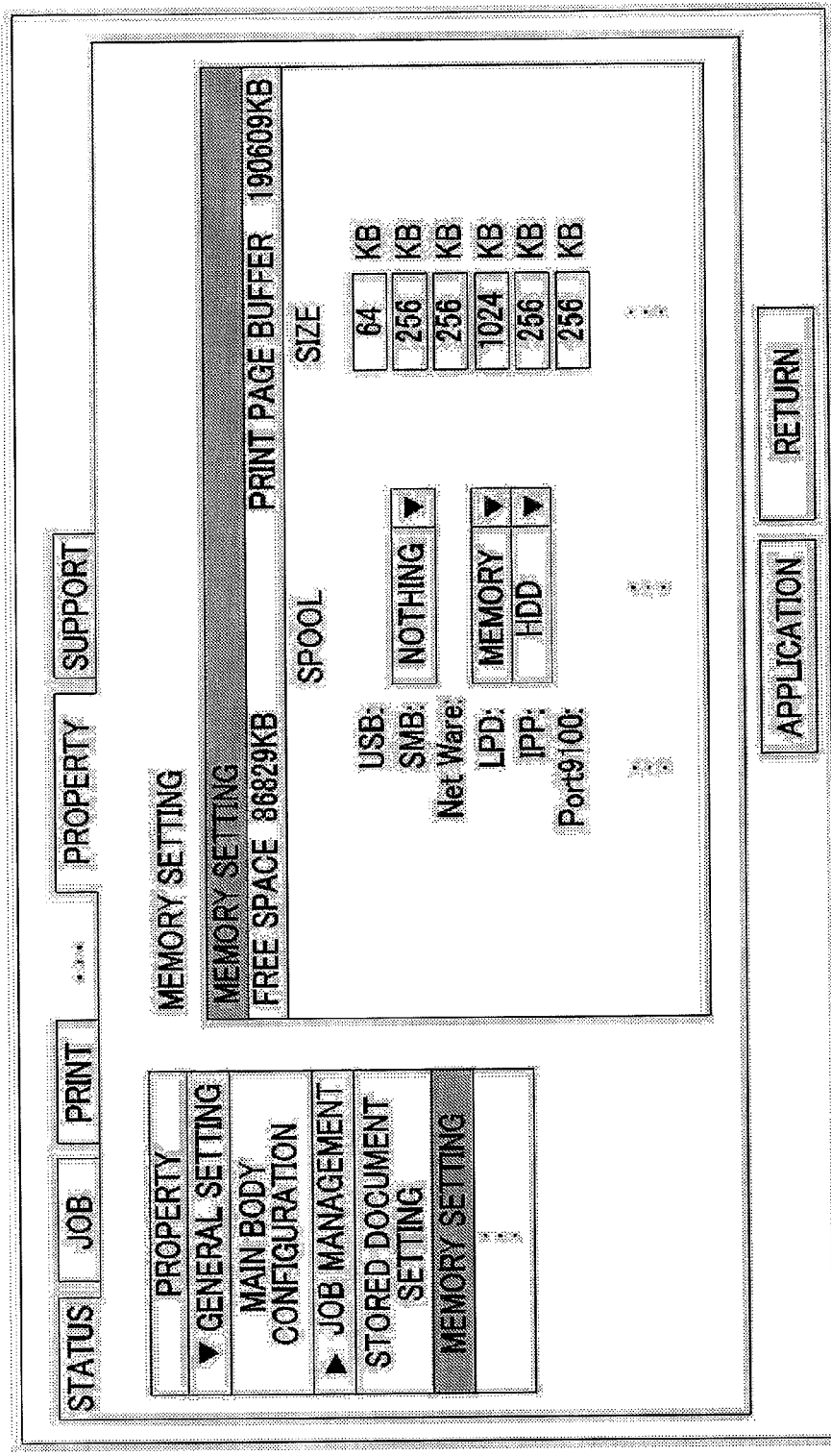
FIG. 3B is a diagram illustrating an example of a memory setting screen registered in the first database 19A.

FIG. 3B shows an example of a memory setting screen registered in the first database 19A. The memory setting screen includes set information indicating whether to spool data (set information including the spool destination of data) or set information indicating the size of a buffer allocated to each protocol. The set information is machine memory information corresponding to the memory setting screen which is registered in the first database 19A.

Figure 4A:
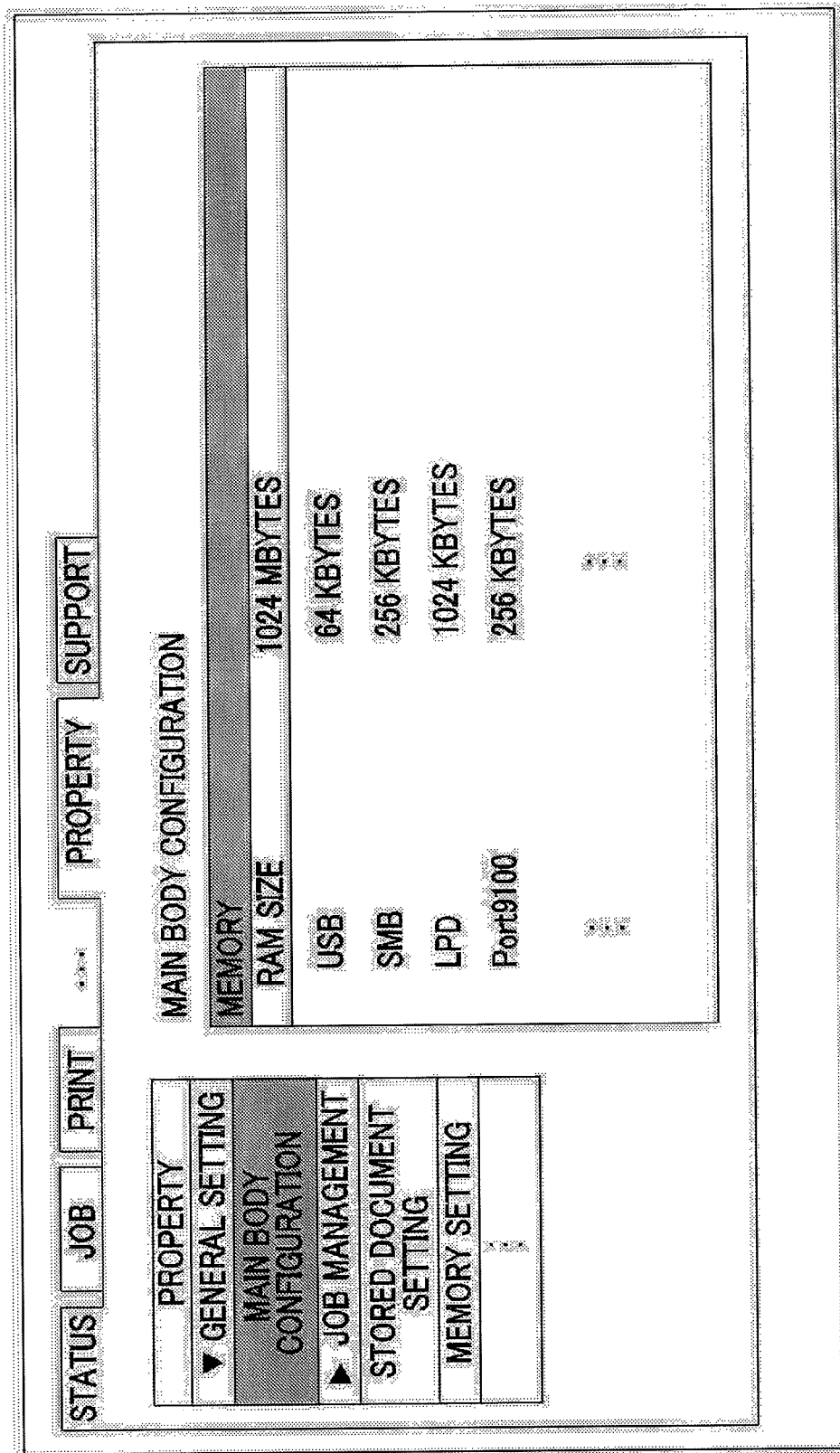
FIG. 4A is a diagram illustrating an example of a main body configuration screen registered in the first database 19A.

FIG. 4A shows an example of a main body configuration screen registered in the first database 19A. The main body configuration screen includes information indicating a RAM size and information indicating the size of the buffer allocated to each protocol. The information is machine memory information corresponding to a main body configuration setting screen which is registered in the first database 19A.

FIG. 4B shows an example of a job status confirmation screen registered in the first database 19A. The job status confirmation screen includes as a job list the information of a job name, the owner of a job, the status of a job, the kind of job, and the number of copies. The information of the job name, the owner of a job, the status of a job, the kind of job, and the number of copies is job information registered in the first database 19A.

FIG. 5 shows an example of a job start screen registered in the first database 19A. The job start screen includes information designating a file to be printed and the information of the number of printouts, the settings for sorting, the setting of a screen, and the setting of a stapler. The information items are print parameters registered in the first database 19A.

FIG. 2B shows an example of the second database 19B stored in the HDD 19.

The second database 19B indicates the relationship between the screen displayed by the client PC and the set information included in the screen. The second database 19B is used when the host name or the IP address acquired from the client PC is not registered in the first database 19A. Specifically, when the host name or the IP address acquired from the client PC is not registered in the first database 19A, the CPU 16 reads the set information and the information of the screen corresponding to the screen request acquired from the client PC from the second database 19B and registers the acquired host name or IP address, the read information of the screen, and the read set information in the first database 19A.

Tray information registered in the second database 19B indicates the priority of plural trays in the image processing apparatus 1. Security set information registered in the second database 19B includes, for example, information indicating the setting of the notation of a user ID or information indicating the setting of the recording of authentication failure.

FIG. 2C is a diagram illustrating an example of the third database 19C stored in the HDD 19.

The third database 19C indicates the relationship between the screen displayed by the client PC and an association screen associated with the screen. The third database 19C is used when the host name or the IP address acquired from the client PC is not registered in the first database 19A. Specifically, when the host name or the IP address acquired from the client PC is not registered in the first database 19A, the CPU 16 reads the information of the screen corresponding to the screen request acquired from the client PC and the information of the association screen associated with the screen which corresponds to the screen request acquired from the client PC from the third database 19C, and calculates the number of client PCs that display the same screen as the read information of the screen and the read information of the association screen from the first database 19A.

In this exemplary embodiment, the database is divided into the first database 19A, the second database 19B, and the third database 19C. However, the first database 19A, the second database 19B, and the third database 19C may be integrated into one database. In this case, the association between the information items included in the first database 19A, the second database 19B, and the third database 19C is maintained.

Figure 6B:
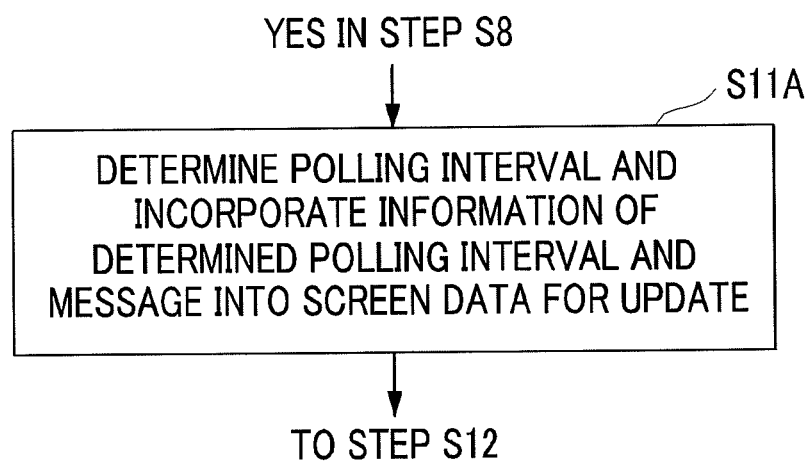
FIG. 6B is a flowchart illustrating a first modification of the process shown in FIG. 6A.

FIG. 6A is a flowchart illustrating the process of the CPU 16 in the image processing apparatus 1. FIG. 6B is a flowchart illustrating a first modification of the process shown in FIG. 6A.

In FIG. 6A, for example, when receiving a screen display request from the client PC 2A (Step S1), the CPU 16 acquires the host name or IP address of the client PC 2A and the information of a requested screen from the screen display request (Step S2).

The CPU 16 checks whether the client PC 2A accesses the requested screen. Specifically, the CPU 16 determines whether the acquired host name or IP address of the client PC 2A is registered in the first database 19A (Step S3).

When the determination result in Step S3 is "NO", the CPU 16 writes the acquired host name or IP address and the acquired information of the requested screen in the first database 19A (Step S4). Specifically, the acquired host name or IP address is written in the item "host name/IP" of the first database 19A and the information of the requested screen is written in the item "displayed screen" of the first database 19A. Then, the process proceeds to Step S7, which will be described below.

When the determination result in Step S3 is "YES", the CPU 16 determines whether the requested screen is the same as the screen displayed by the client PC 2A on the basis of the acquired host name or IP address, the acquired information of the requested screen, and the first database 19A (Step S5). In this case, the CPU 16 compares the acquired information of the request screen with the information of the "displayed screen" of the first database 19A which corresponds to the acquired host name or IP address. When the information of the requested screen is identical to the information of the "displayed screen", the requested screen is the same as the screen displayed by the client PC 2A.

When the determination result in Step S5 is "NO", the CPU 16 changes the information of the "displayed screen" of the first database 19A which corresponds to the acquired host name or IP address to the acquired information of the requested screen (Step S6). Then, the process proceeds to Step S7, which will be described below.

Then, the CPU 16 refers to the first database 19A on the basis of the acquired information of the requested screen (Step S7). The CPU 16 determines whether the "displayed screen" has been checked to the end of the first database 19A on the basis of the acquired information of the requested screen (Step S8). When the determination result in Step S8 is "NO", the CPU 16 determines whether the information of the screen identical to the acquired information of the requested screen is registered in the first database 19A, that is, whether another client PC displays the same screen as the requested screen (Step S9). When the determination result in Step S9 is "NO", the process returns to Step S8. When the determination result in Step S9 is "YES", the CPU 16 increases the value of a counter 16A (Step S10). The counter 16A included in the CPU 16 counts the number of client PCs that display the same screen as the requested screen. A loop process from Step S8 to Step S10 is for calculating the number of client PCs that display the same screen as the requested screen.

When the determination result in Step S8 is "YES", the CPU 16 determines a polling interval and incorporates the information of the determined polling interval into screen data for update using an html tag or JavaScript (Step S11). The polling interval is determined by, for example, one minute (reference value)/(the count value of the counter 16A+1) (that is, the number of client PCs that display the same screen as the requested screen+one client PC that displays the requested screen). For example, when the number of client PCs that display the same screen as the requested screen is two, the polling interval is about 20 seconds (=one minute/ (2+1)). The reference value used to determine the polling interval is stored in the non-volatile memory 17. In addition, the reference value is not limited to one minute.

Then, the CPU 16 transmits the screen data for update to the client PC 2A corresponding to the acquired host name or IP address (Step S12).

Since the polling interval is included in the screen data for update, the entire process shown in FIG. 6A is repeatedly performed whenever the polling time elapses.

Figure 7:
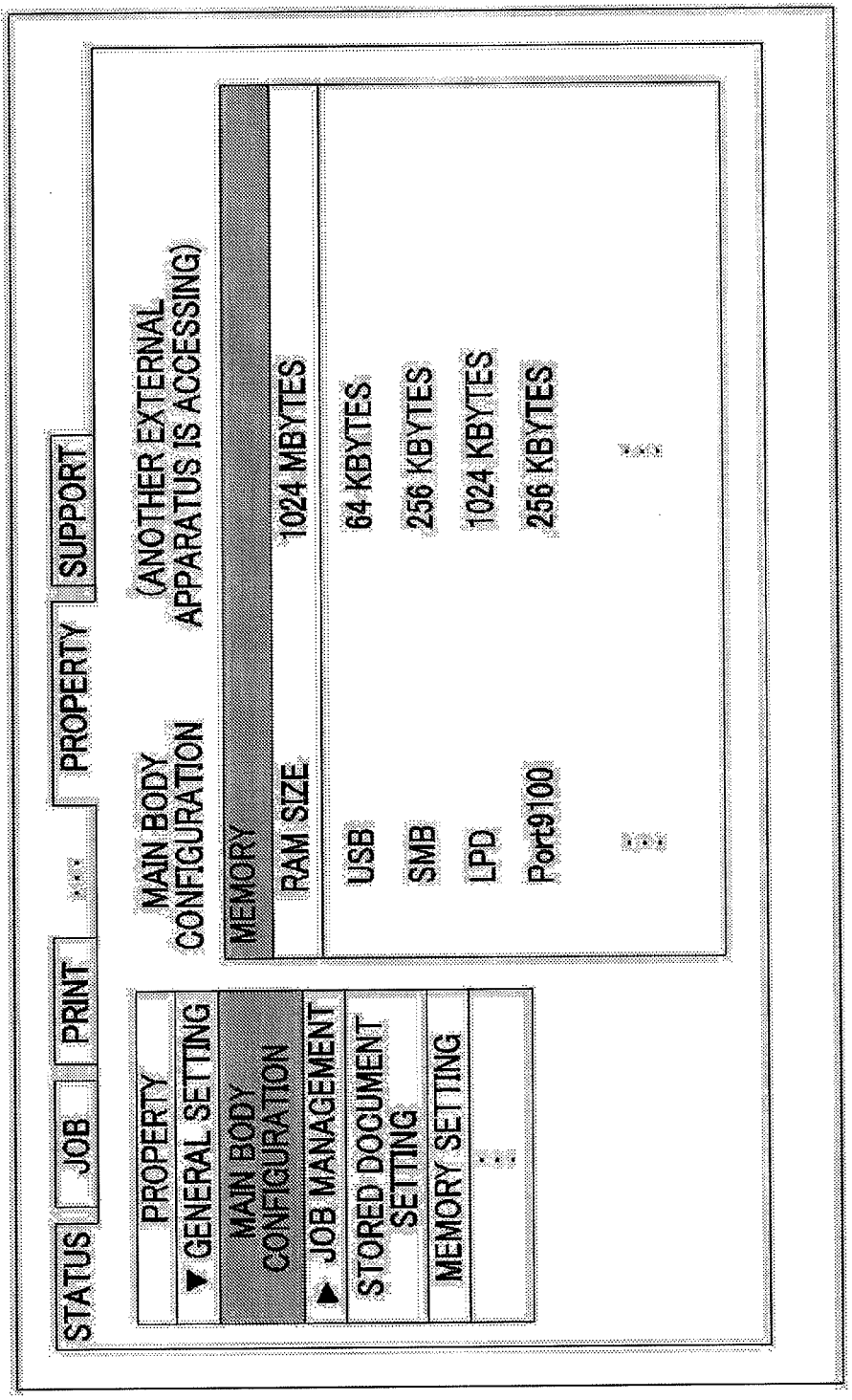
FIG. 7 is a diagram illustrating an example of screen data for update including a message indicating that another client PC is accessing the same screen.

In Step S11, the CPU 16 incorporates the determined polling interval into the screen data for update. Instead of this operation, when the value of the counter 16A is equal to or more than 1, the CPU 16 may incorporate the determined polling interval and at least one of a message indicating that another client PC is accessing the same screen and a message noting that the polling interval is changed into the screen data for update (Step S11A in FIG. 6B). FIG. 7 shows an example of the screen data for update including the message indicating that another client PC is accessing the same screen. In this way, the user of the external apparatus is notified that the set information of the image processing apparatus 1 is likely to be changed.

According to the process shown in FIG. 6A, the polling interval for the client PC that outputs the screen display request is reduced depending on the sum of the number of client PCs that output the screen display request and the number of client PCs that display the same screen as that of the client PC. That is, the polling interval for the client PC that outputs the screen display request is less than that for the client PC that displays the same screen as the screen of the client PC. Therefore, when the set information of the image processing apparatus 1 is displayed by plural client PCs, the omission of the display of a change in the set information is prevented.

FIG. 8 is a flowchart illustrating a second modification of the process shown in FIG. 6A. In the second modification of the process shown in FIG. 6A, the CPU 16 updates the item "set information" in the first database 19A using the second database 19B and determines the polling interval on the basis of the sum of the number of client PCs that display set information included in the requested screen and the number of client PCs that display the same set information as the set information. In FIG. 8, the same steps as those in FIGS. 6A and 6B are denoted by the same step numbers as those in FIGS. 6A and 6B and a description thereof will not be repeated.

After Steps S4 and S6, the CPU 16 searches for an item "screen" in the second database 19B shown in FIG. 2B on the basis of the acquired information of the requested screen and acquires the set information in the requested screen (Step S21). For example, when the acquired host name or IP address is "111.111.111.111" and the acquired information of the request screen is a "destination table screen", the CPU 16 searches for the item "screen" in the second database 19B shown in FIG. 2B and acquires "abbreviated information" as the set information included in the requested screen.

The CPU 16 writes the set information included in the acquired requested screen in the item "set information" in the first database 19A (Step S22). For example, when the acquired host name or IP address is "111.111.111.111", the CPU 16 writes the abbreviated information acquired in Step S21 in the item "set information" of the first database 19A corresponding to the IP address "111.111.111.111". Then, the process proceeds to Step S23.

Then, the CPU 16 refers to the item "set information" of the first database 19P, on the basis of the set information included in the requested screen (Step S23). However, since the information of the requested screen is acquired in Step S2, the CPU 16 may acquire the set information included in the requested screen from the second database 19B.

The CPU 16 determines whether the item "set information" has been checked to the end of the first database 19A on the basis of the set information in the requested screen (Step S24). When the determination result in Step S24 is "NO", the CPU 16 determines whether the same set information as that in the requested screen is registered in the first database 19A, that is, whether another client PC displays the same set information as that in the requested screen (Step S25). When the determination result in Step S25 is "NO", the process returns to Step S23. When the determination result in Step S25 is "YES", the CPU 16 increases the value of the counter 16A (Step S10). The counter 16A included in the CPU 16 counts the number of client PCs that display the same set information as that in the requested screen. A loop process of Step S24→Step S25→Step S10→Step S24 is for calculating the number of client PCs that display the same set information as that in the requested screen.

When the determination result in Step S24 is "YES", the CPU 16 determines the polling interval and incorporates the information of the determined polling interval and a message indicating that another client PC is accessing the same screen or a message noting that the polling interval is changed into the screen data for update using an html tag or JavaScript (Step S11A). The polling interval is determined by, for example, one minute (reference value)/(the count value of the counter 16A+1) (that is, the number of client PCs that display the same set information as that in the requested screen+one client PC that displays the set information in the requested screen). For example, when the number of client PCs that display the same set information as that in the requested screen is two, the polling interval is about 20 seconds (=one minute/(2+1)). The reference value used to determine the polling interval is not limited to one minute. Then, the process proceeds to Step S12.

Since the polling interval is included in the screen data for update, the entire process shown in FIG. 8 is repeatedly performed whenever the polling time elapses.

According to the process shown in FIG. 8, the polling interval for the client PC that outputs the screen display request is reduced depending on the sum of the number of client PCs that output the screen display request and the number of client PCs that display the same set information as that in the screen of the client PC. That is, the polling interval for the client PC that outputs the screen display request is less than that for the client PC that displays the same set information as that in the screen of the client PC. Therefore, when the set information of the image processing apparatus 1 is displayed by plural client PCs, the omission of the display of a change in the set information is prevented.

FIG. 9 is a flowchart illustrating a third modification of the process shown in FIG. 61. In the third modification of the process shown in FIG. 6A, the CPU 16 acquires the information of an association screen associated with the requested screen using the third database 19C and determines the polling interval on the basis of the sum of the number of client PCs that display the requested screen and the number of client PCs that display the same screen as the requested screen or the association screen associated with the requested screen.

In FIG. 9, the same steps as those in FIGS. 6A and 6B are denoted by the same step numbers as those in FIGS. 6A and 6B and a description thereof will not be repeated.

After Steps S4 and S6, the CPU 16 searches for the item "screen" of the third database 19C shown in FIG. 2C on the basis of the acquired information of the requested screen and acquires the information of the association screen associated with the requested screen (Step S31). For example, when the acquired information of the requested screen is a "job status confirmation screen", the CPU 16 searches for the item "screen" of the third database 19C shown in FIG. 2C and acquires a "print start screen" and a "file extraction screen" as the information of the association screen.

Then, the CPU 16 refers to the item "displayed screen" of the first database 19A on the basis of the acquired information of the requested screen and the information of the association screen associated with the requested screen (Step S32). The CPU 16 determines whether the item "displayed screen" has been checked to the end of the first database 19A on the basis of the acquired information of the requested screen and the information of the association screen associated with the requested screen (Step S33). When the determination result in Step S33 is "NO", the CPU 16 determines whether the information of the screen that is the same as the acquired information of the requested screen or the information of the association screen is registered in the first database 19A, that is, whether another client PC displays the same screen as the requested screen or the association screen (Step S34). When the determination result in Step S34 is "NO", the process proceeds to Step S33. When the determination result in Step S34 is "YES", the CPU 16 increases the value of the counter 16A (Step S10). The counter 16A included in the CPU 16 counts the number of client PCs that display the same screen as the requested screen and the number of client PCs that display the association screen. A loop process of Step S33→Step S34→Step S10→Step S34 is for calculating the number of client PCs that display the same screen as the requested screen and the number of client PCs that display the association screen.

When the determination result in Step S33 is "YES", the CPU 16 determines the polling interval and incorporates the information of the determined polling interval and a message indicating that another client PC is accessing the same screen or a message noting that the polling interval is changed into the screen data for update using an html tag or JavaScript (Step S11A). The polling interval is determined by, for example, one minute (reference value)/(the count value of the counter 16A+1) (that is, the number of client PCs that display the same screen as the requested screen or the association screen+one client PC that displays the requested screen). For example, when the sum of the number of client PCs that display the same screen as the requested screen and the number of client PCs that display the association screen is two, the polling interval is about 20 seconds (=one minute/(2+1)). The reference value used to determine the polling interval is not limited to one minute. Then, the process proceeds to Step S12.

Since the polling interval is included in the screen data for update, the entire process shown in FIG. 9 is repeatedly performed whenever the polling time elapses.

According to the process shown in FIG. 9, the polling interval for the client PC that outputs the screen display request is reduced depending on the sum of the number of client PCs that output the screen display request and the number of client PCs that display the same screen as the screen of the client PC or the association screen associated with the screen of the client PC. That is, the polling interval for the client PC that outputs the screen display request is less than that for the client PC that displays the same screen as the screen of the client PC or the association screen associated with the screen of the client PC. Therefore, when the set information of the image processing apparatus 1 is displayed by plural client PCs, the omission of the display of a change in the set information is prevented.

FIG. 10 is a flowchart illustrating a fourth modification of the process shown in FIG. 6A. In the fourth modification of the process shown in FIG. 6A, when there is a request to change various kinds of set information, the CPU 16 changes the corresponding set information stored in the non-volatile memory 17 and displays a message indicating the change in the set information on the screen including the changed set information. In FIG. 10, the same steps as those in FIGS. 6A and 6B are denoted by the same step numbers as those in FIGS. 6A and 6B and a description thereof will not be repeated.

In FIG. 10, the CPU 16 receives a request to change the set information from, for example, the client PC 2A (Step S41). The request to change the set information is, for example, an instruction to change the set information (for example, information indicating the setting of a spool position or a memory size) included in the memory setting screen shown in FIG. 3B or an instruction to change the set information (for example, information indicating the setting of a file, the number of printouts, or the settings for sorting) included in the job start screen shown in FIG. 5.

In Step S41, for example, it is assumed that a request to change machine memory information included in the memory setting screen is received from the client PC 2B with an IP address "222.222.222.222". A change flag corresponding to the IP address "222.222.222.222" in the first database 19A shown in FIG. 2A is set to an off state. A change flag corresponding to the client PC 2A with an IP address "223.234.234.234" which displays the same memory setting screen is set to an off state at the beginning.

The CPU 16 changes the corresponding set information stored in the non-volatile memory 17 in response to the request to change the set information (Step S42). In addition, the CPU 16 searches for the host name or IP address of a client PC (in this exemplary embodiment, the client PC 2A), which is other than the client PC 2B outputting the request to change the set information and displays the same screen as the screen including the changed set information, from the first database 19A and sets a change flag corresponding to the searched host name or IP address in the first database 19A to an on state (Step S43). For example, as shown in FIG. 2A, the CPU 16 changes the change flag corresponding to the client PC 2A with the IP address "223.234.234.234" from an off state to an on state. Then, the process proceeds to Step S1.

Figure 11:
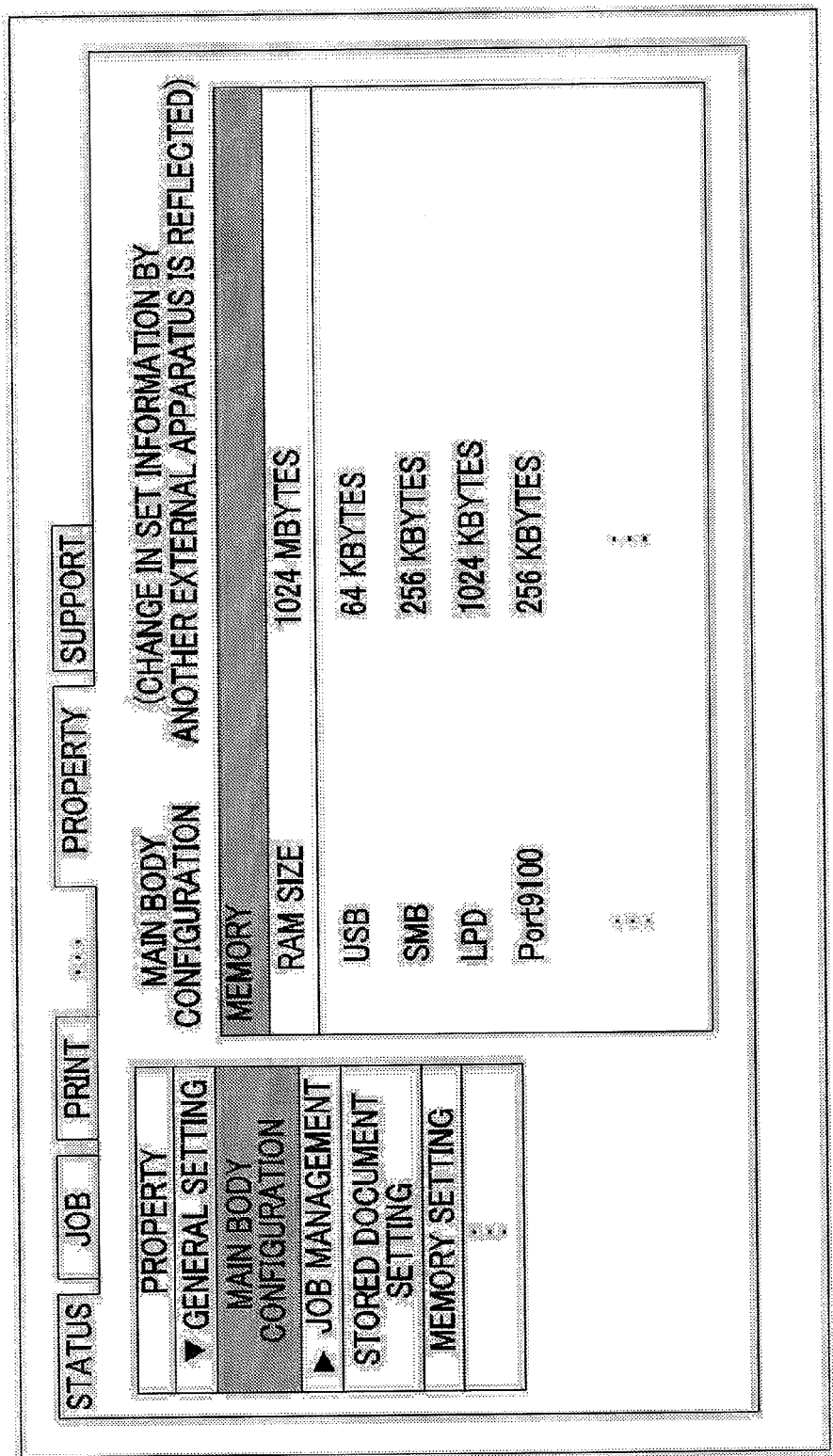
FIG. 11 is a diagram illustrating an example of screen data for update including a message indicating that set information has been changed.

When the determination result in Step S5 is "YES" (that is, when the requested screen is the same as the screen displayed by the client PC 2A), the CPU 16 determines whether the change flag corresponding to the client PC 2A (IP address "223.234.234.234") is in an on state on the basis of the first database 19A (Step S44). When the determination result in Step S44 is "YES", the CPU 16 incorporates a message indicating that the set information has been changed into the screen data for update (Step S45). FIG. 11 shows an example of the screen data for update including the message indicating that the set information has been changed. Then, the process proceeds to Step S7. When the determination result in Step S44 is "NO", the process proceeds to Step S7.

After Step S11, the CPU 16 turns off the change flag corresponding to the client PC 2A (IP address "223.234.234.234") (Step S46). Then, the process proceeds to Step S12.

According to the process shown in FIG. 10, when the client PC (2B) that displays the same screen as that of the client PC (2A) changes the set information, the change flag is turned on. When the change flag is turned on, the CPU 16 incorporates the message indicating that the set information has been changed and the information of the polling interval into screen data (see Steps S7 and S11). Therefore, the user of the client PC outputting the screen display request is notified that the set information of the image processing apparatus 1 has been changed.

As described above, according to this exemplary embodiment, the polling interval is reduced depending on the total number of client PCs that display the same screen and the total number of client PCs that display the same set information or the total number of client PCs that display the same screen or the association screen. That is, the polling interval is dynamically changed. Therefore, when the set information of the image processing apparatus 1 is displayed by plural client PCs, the omission of the display of a change in the set information is prevented. In addition, the user of the client PC may rapidly know a change in the set information of the image processing apparatus 1 by another client PC or the possibility of the change in the set information.

In the above-described exemplary embodiment, when there is another client PC that displays the same screen as that of the client PC outputting a display request, the CPU 16 reduces the polling interval for the client PC outputting the display request. In addition, when there is another client PC that displays the same content as that (set information) of the screen of the client PC outputting the display request, the CPU 16 reduces the polling interval for the client PC outputting the display request.

The polling interval is determined by dividing the reference value by any one of the total number of client PCs that display the same screen, the total number of client PCs that display the same set information, and the total number of client PCs that display the same screen or the association screen. However, the polling interval may be determined by other methods. For example, when any one of the total number of client PCs that display the same screen, the total number of client PCs that display the same set information, and the total number of client PCs that display the same screen or the association screen is more than a predetermined value (for example, 5), the CPU 16 may reduce the polling interval in stages. In this case, the CPU 16 may reduce the polling interval by, for example, 5 seconds whenever any one of the numbers of client PCs is more than the predetermined value by one.

For example, when any one of the total number of client PCs that display the same screen, the total number of client PCs that display the same set information, and the total number of client PCs that display the same screen or the association screen is more than a predetermined value (for example, 5), the CPU 16 may divide the reference value by any one of the numbers of client PCs, thereby reducing the polling interval.

When there is another client PC that displays the same screen, another client PC that displays the same set information, or another client PC that displays the same screen or the association screen, the CPU 16 may determine the polling interval to be half the reference value or a quarter of the reference value, regardless of any one of the numbers of client PCs.

The CPU 16 may reduce the polling interval in stages according to a predetermined value whenever any one of the numbers of client PCs is increased by one. For example, when any one of the numbers of client PCs is 1, the predetermined value is about one minute. When any one of the numbers of client PCs is 2, the predetermined value is about 50 seconds. When any one of the numbers of client PCs is 3, the predetermined value is about 40 seconds. When any one of the numbers of client PCs is 4, the predetermined value is about 30 seconds.

A storage medium storing a software program for implementing the functions of the image processing apparatus 1 may be provided to the image processing apparatus 1 and the CPU 16 may read and execute the program stored in the storage medium. In this case, the same effect as that in the above-described exemplary embodiment is obtained. For example, there is a CD-ROM, a DVD, or an SD card as the storage medium for providing the program. The CPU 16 may execute the software program for implementing the functions of the image processing apparatus 1 to obtain the same effect as that in the above-described exemplary embodiment.

The invention is not limited to the above-described exemplary embodiment, but various kinds of modifications and changes of the invention may be made without departing from the scope and spirit of the invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
an acquiring unit that acquires a display request including a first external apparatus identification information capable of identifying a first external apparatus and screen identification information capable of identifying a screen from the first external apparatus;
a storage unit that stores external apparatus screen information in which the first external apparatus identification information and the screen identification information acquired by the acquiring unit are associated with each other;
an update unit that updates the first external apparatus screen information whenever the display request is acquired;
a determining unit that determines a polling interval for the first external apparatus on the basis of the external apparatus screen information stored in the storage unit; and
a transmitting unit that transmits, to the first external apparatus, screen data which includes information of the determined polling interval and is displayed on a screen corresponding to the display request,
wherein, when a second external apparatus identification information item corresponding to the same screen identification information as that included in the display request is stored in the storage unit, the determining unit determines the polling interval for the first external apparatus as a first polling interval, and when the second external apparatus identification information item is not stored in the storage unit, the determining unit determines the polling interval for the first external apparatus as a second polling interval, wherein the first polling interval is smaller than the second polling interval.

2. The image processing apparatus according to claim 1,
wherein the first external apparatus screen information further includes set information indicating content which is displayed on the screen identified by the screen identification information, and
when the second external apparatus identification information item corresponding to the same set information as that corresponding to the screen identification information in the display request is stored in the storage unit, the determining unit determines the polling interval for the first external apparatus as a third polling interval, and when the second external apparatus identification information item is not stored in the storage unit, the determining unit determines the polling interval for the first external apparatus as a fourth polling interval, wherein the third polling interval is smaller than the fourth polling interval.

3. The image processing apparatus according to claim 2,
wherein the determining unit determines the polling interval for the first external apparatus on the basis of the number of set information items that are the same as the set information included in the display request and are stored in the storage unit.

4. The image processing apparatus according to claim 2,
wherein the transmitting unit incorporates at least one of information indicating that the second external apparatus is accessing the same screen and information noting that the polling interval for the first external apparatus is changed and the information of the determined polling interval into the screen data.

5. The image processing apparatus according to claim 2,
wherein the first external apparatus screen information further includes change information indicating that the set information indicating content which is displayed on the screen identified by the screen identification information has been changed,
when the second external apparatus that displays the same screen as that of the first external apparatus outputting the display request changes the set information, the change information is turned on; and
when the change information of the first external apparatus outputting the display request is turned on, the transmitting unit incorporates a message indicating that the set information has been changed and the information of the determined polling interval into the screen data.

6. The image processing apparatus according to claim 3,
wherein the transmitting unit incorporates at least one of information indicating that the second external apparatus is accessing the same screen and information noting that the polling interval for the first external apparatus is changed and the information of the determined polling interval into the screen data.

7. The image processing apparatus according to claim 3,
wherein the first external apparatus screen information further includes change information indicating that the set information indicating content which is displayed on the screen identified by the screen identification information has been changed,
when the second external apparatus that displays the same screen as that of the first external apparatus outputting the display request changes the set information, the change information is turned on; and
when the change information of the first external apparatus outputting the display request is turned on, the transmitting unit incorporates a message indicating that the set information has been changed and the information of the determined polling interval into the screen data.

8. The image processing apparatus according to claim 1,
wherein the first external apparatus screen information further includes association screen information indicating an association screen which is associated with the screen identified by the screen identification information, and when the second external apparatus identification information item corresponding to the same screen identification information as that in the display request or the association screen information associated with the screen identification information in the display request is stored in the storage unit, the determining unit determines the polling interval for the first external apparatus as a third polling interval, and when the second external apparatus identification information item is not stored in the storage unit, the determining unit determines the polling interval for the first external apparatus as a fourth polling interval, wherein the third polling interval is smaller than the fourth polling interval.

9. The image processing apparatus according to claim 8, wherein the determining unit determines the polling interval for the first external apparatus on the basis of the number of screen identification information items which are the same as the screen identification information included in the display request and are stored in the storage unit or the number of association screen information items which are associated with the screen identification information in the display request and are stored in the storage unit.

10. The image processing apparatus according to claim 8, wherein the transmitting unit incorporates at least one of information indicating that the second external apparatus is accessing the same screen and information noting that the polling interval for the first external apparatus is changed and the information of the determined polling interval into the screen data.

11. The image processing apparatus according to claim 8, wherein the first external apparatus screen information further includes change information indicating that the set information indicating content which is displayed on the screen identified by the screen identification information has been changed, when the second external apparatus that displays the same screen as that of the first external apparatus outputting the display request changes the set information, the change information is turned on; and when the change information of the first external apparatus outputting the display request is turned on, the transmitting unit incorporates a message indicating that the set information has been changed and the information of the determined polling interval into the screen data.

12. The image processing apparatus according to claim 9, wherein the transmitting unit incorporates at least one of information indicating that the second external apparatus is accessing the same screen and information noting that the polling interval for the first external apparatus is changed and the information of the determined polling interval into the screen data.

13. The image processing apparatus according to claim 9, wherein the first external apparatus screen information further includes change information indicating that the set information indicating content which is displayed on the screen identified by the screen identification information has been changed, when the second external apparatus that displays the same screen as that of the first external apparatus outputting the display request changes the set information, the change information is turned on; and when the change information of the first external apparatus outputting the display request is turned on, the transmitting unit incorporates a message indicating that the set information has been changed and the information of the determined polling interval into the screen data.

14. The image processing apparatus according to claim 1, wherein the determining unit determines the polling interval for the first external apparatus on the basis of the number of screen identification information items that are the same as the screen identification information included in the display request and are stored in the storage unit.

15. The image processing apparatus according to claim 14, wherein the transmitting unit incorporates at least one of information indicating that the second external apparatus is accessing the same screen and information noting that the polling interval for the first external apparatus is changed and the information of the determined polling interval into the screen data.

16. The image processing apparatus according to claim 14, wherein the first external apparatus screen information further includes change information indicating that the set information indicating content which is displayed on the screen identified by the screen identification information has been changed, when the second external apparatus that displays the same screen as that of the first external apparatus outputting the display request changes the set information, the change information is turned on; and when the change information of the first external apparatus outputting the display request is turned on, the transmitting unit incorporates a message indicating that the set information has been changed and the information of the determined polling interval into the screen data.

17. The image processing apparatus according to claim 1, wherein the transmitting unit incorporates at least one of information indicating that the second external apparatus is accessing the same screen and information noting that the polling interval for the first external apparatus is changed and the information of the determined polling interval into the screen data.

18. The image processing apparatus according to claim 1, wherein the first external apparatus screen information further includes change information indicating that set information indicating content which is displayed on the screen identified by the screen identification information has been changed, when the second external apparatus that displays the same screen as that of the first external apparatus outputting the display request changes the set information, the change information is turned on; and when the change information of the first external apparatus outputting the display request is turned on, the transmitting unit incorporates a message indicating that the set information has been changed and the information of the determined polling interval into the screen data.

19. An image processing method comprising:

acquiring a display request including a first external apparatus identification information capable of identifying a first external apparatus and screen identification information capable of identifying a screen from the first external apparatus;

storing external apparatus screen information in which the acquired external apparatus identification information and screen identification information are associated with each other;

updating the external apparatus screen information whenever the display request is acquired;

determining a polling interval for the first external apparatus on the basis of the stored external apparatus screen information; and transmitting, to the first external apparatus, screen data which includes information of the determined polling interval and is displayed on a screen corresponding to the display request, wherein, when a second external apparatus identification information item corresponding to the same screen identification information as that included in the display request is stored, the polling interval for the first external apparatus is determined as a first polling interval, and when a second external apparatus identification information item corresponding to the same screen identification information as that included in the display request is not stored, the polling interval for the first external apparatus is determined as a second polling interval, wherein the first polling interval is smaller than the second polling interval.

20. A non-transitory computer readable medium storing a program that causes a computer to function as:

an acquiring unit that acquires a display request including a first external apparatus identification information capable of identifying a first external apparatus and screen identification information capable of identifying a screen from the first external apparatus;

a storage unit that stores external apparatus screen information in which the external apparatus identification information and the screen identification information acquired by the acquiring unit are associated with each other;

an update unit that updates the external apparatus screen information whenever the display request is acquired;

a determining unit that determines a polling interval for the first external apparatus on the basis of the external apparatus screen information stored in the storage unit; and a transmitting unit that transmits, to the first external apparatus, screen data which includes information of the determined polling interval and is displayed on a screen corresponding to the display request, wherein, when a second external apparatus identification information item corresponding to the same screen identification information as that included in the display request is stored in the storage unit, the determining unit determines the polling interval for the first external apparatus as a first polling interval, and when a second external apparatus identification information item corresponding to the same screen identification information as that included in the display request is not stored in the storage unit, the determining unit determines the polling interval for the first external apparatus as a second polling interval, wherein the first polling interval is smaller than the second polling interval.

* * * * *